Dec. 24, 1940.   F. B. KEALL ET AL   2,225,639
MACHINE FOR SHAPING UPPERS OVER LASTS
Filed Jan. 5, 1940   6 Sheets-Sheet 1

INVENTORS
Frank B. Keall
Harold Lane
By their attorney
Victor Coll

Dec. 24, 1940.                F. B. KEALL ET AL                    2,225,639
                    MACHINE FOR SHAPING UPPERS OVER LASTS
                         Filed Jan. 5, 1940              6 Sheets-Sheet 3

INVENTORS
Frank B. Keall
Harold Lane
By their Attorney
Victor Cobb

Dec. 24, 1940.   F. B. KEALL ET AL   2,225,639
MACHINE FOR SHAPING UPPERS OVER LASTS
Filed Jan. 5, 1940   6 Sheets-Sheet 4

Dec. 24, 1940.  F. B. KEALL ET AL  2,225,639
MACHINE FOR SHAPING UPPERS OVER LASTS
Filed Jan. 5, 1940   6 Sheets-Sheet 6
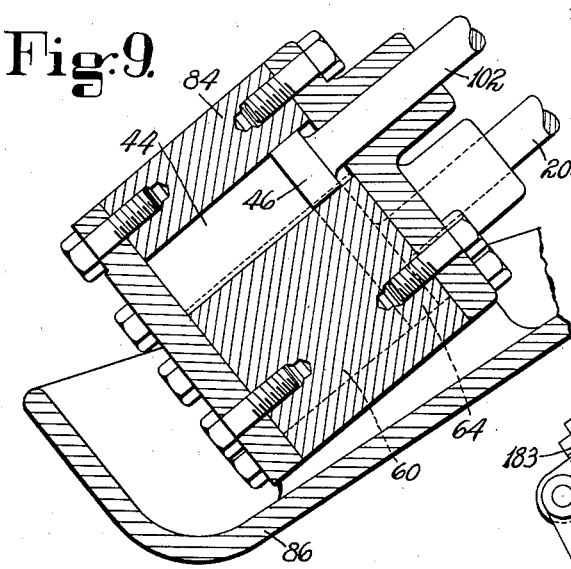
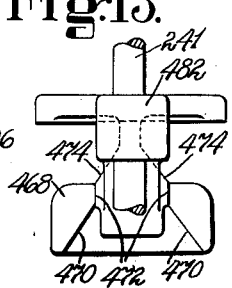
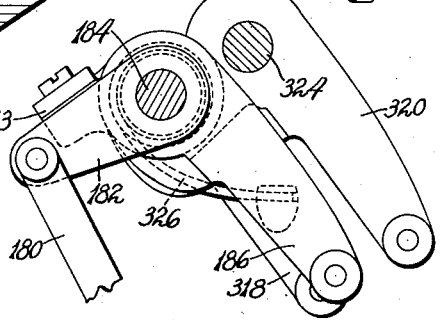
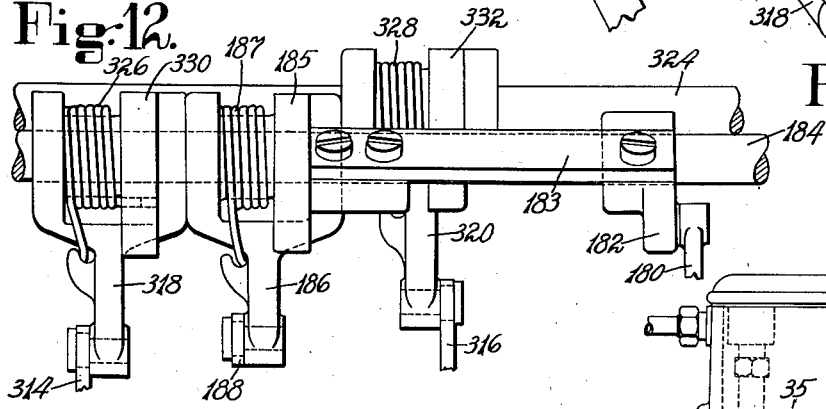
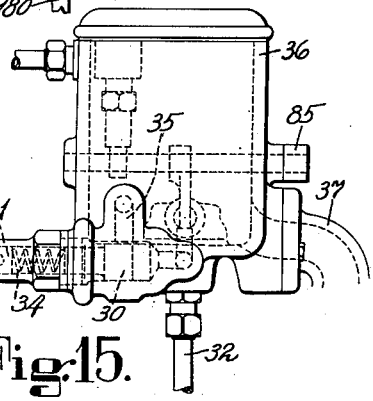
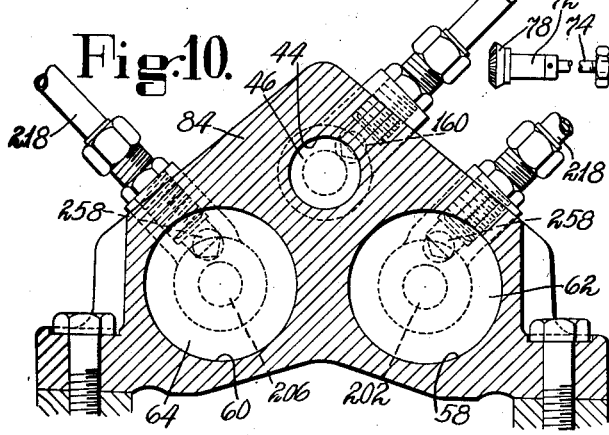

Patented Dec. 24, 1940

2,225,639

UNITED STATES PATENT OFFICE 2,225,639

MACHINE FOR SHAPING UPPERS OVER LASTS

Frank Bycroft Keall and Harold Lane, Leicester, England, assignors to United Shoe Machinery Corporation, Borough of Flemington, N. J., a corporation of New Jersey Application January 5, 1940, Serial No. 312,518 In Great Britain February 10, 1939

122 Claims. (Cl. 12—4)

This invention relates to machines for shaping uppers over lasts, and is herein illustrated as embodied in a modification of a pulling-over machine of a well-known type disclosed in United States Letters Patent No. 1,510,851, granted on October 7, 1924 on an application of A. E. Jerram and J. Gouldbourn, many of the characteristic features of machines of this type being more fully disclosed in other United States Letters Patent including especially Letters Patent No. 1,029,387, granted on June 11, 1912 on an application of R. F. McFeely. It is to be understood, however, that the invention is not limited to machines of that particular type and that in some novel aspects also it is not limited to pulling-over machines.

A machine of the above-mentioned type is provided with a toe gripper and side grippers for gripping the margin of an upper respectively at the end of the toe and at opposite sides of the forepart and for pulling the upper over a last, upper-gripping and pulling movements being imparted to these grippers in a cycle of automatic power operations of the machine by cams acting yieldingly through "updraw" springs on levers connected to the grippers. The machine comes automatically to a stop with the upper held under tension by the grippers, and while the machine is thus at rest the operator is enabled to inspect the upper and, if necessary, to adjust it relatively to the last or to subject it to increased tension by manual movement of one or more of the grippers. He may, for example, shift the forepart of the upper laterally of the last by moving the opposite side grippers through their operating levers in opposite directions respectively, or may increase the force of the pull of the side grippers on the upper by moving both these levers in the same direction heightwise of the last. After the upper has been properly adjusted and tensioned, the operator starts the machine again in operation. In this second stage of the cycle side clamp arms are swung inwardly into clamping and holding relation to the shoe at the sides of the forepart and tacking devices are moved into tack-driving positions and drive tacks to fasten the margin of the upper to the insole at the end of the toe and the sides of the forepart, the grippers being opened to release the upper as the tacking devices receive their positioning movements. Thereafter the parts are returned to their starting positions and the machine comes to a stop at the end of the cycle.

Machines of the above-mentioned character have proved in widespread use to be generally satisfactory. For the accomplishment of the best results, however, in the pulling of the upper, and also to avoid danger of damage to relatively light-weight upper materials by any sudden forceful pull of the grippers, it is necessary to adjust the compression of the updraw springs in accordance with the character of the upper materials. To guard further against damage by a pull of that kind at the sides of the forepart and to improve results in the pulling of the upper such machines have been provided with dashpots for retarding the upper-pulling movements of the side grippers. If the best results are to be obtained on different kinds of upper materials it is often necessary to adjust the retarding effect of the dashpot as well as to adjust the compression of the updraw springs. It is further to be noted that the work which the operator may have to perform while the grippers are holding the upper under tension, especially to shift the upper laterally of the last or to increase the force of the pull applied through the side grippers in the manner above described, requires a substantial amount of effort on his part.

In view of the above and other considerations, an object of the present invention is to provide upper-pulling means of an improved character, such as to operate upon upper materials of various kinds without any substantial danger of damage to the stock and such as to require but little adjustment, which can be quickly and conveniently effected, to adapt it to operate in the best manner on different kinds of materials. A further object is to provide a construction such as to reduce substantially as compared with prior machines the amount of work which the operator may have to perform after the pull in adjusting the upper relatively to the last or in varying the force of the pull applied to the upper. For the purposes in view, the machine herein shown is provided with novel fluid-operated means for effecting the pulling of the upper. As illustrated, the toe gripper and the opposite side grippers have each associated therewith a double-acting cylinder and piston device whereby each gripper is operated to grip and pull the upper and is later returned to starting position by pressure of the operating fluid, each said device having associated therewith valve mechanism controlled automatically in the course of the cycle of operations of the machine to cause the corresponding gripper to pull the upper and to return to its starting position at predetermined times. In the construction shown a cam-operated lever is provided for controlling the valve mchanism associated with the device which operates the toe gripper and another cam-operated lever for controlling the two valve mechanisms associated with the devices which operate the side grippers. Preferably, as illustrated, these levers are operated or controlled by cams so formed that the toe gripper first pulls the upper and then relaxes the force of the pull before thereafter again pulling the upper in company with the side grippers. Updraw springs such as used heretofore are dispensed with, and in order that the pull of each gripper may be gradually applied to the upper without any tendency to snatch or tear the upper, the construction shown is further such that the valve mechanisms are controlled not only by the above-mentioned levers, but also by mechanisms movable as determined by the grippers themselves and tending to counteract the effect of the levers, so that only a comparatively restricted opening is provided for the admission of operating fluid to each cylinder and piston device until the upper-pulling movement of the gripper associated therewith is retarded or stopped by resistance of the upper to the force of the pull applied thereto. Such joint control of the valve mechanisms is also effective to render gradual the reverse or return movements of the grippers by the fluid-operated means. As illustrated, the operating fluid consists of oil delivered by a continuously running pump to an accumulator in which it is stored under control of a body of compressed air therein, the pressure of the oil being adjustably determined by a spring-controlled relief valve which opens and permits return of oil to a reservoir supplying the pump when the oil in the accumulator attains a predetermined pressure. It is to be understood, however, that in various novel aspects the invention is not dependent upon the use of a fluid-pressure system of this particular character.

The invention further provides novel means whereby different grippers may be operated respectively by fluid under different pressures, so that the forces applied by the different grippers in pulling the upper may be relatively varied in a convenient manner by effecting a relative variation of the different pressures. As herein illustrated, the pressure of the fluid which is effective to operate the side grippers is normally reduced below the pressure of the fluid in the accumulator, which is the pressure effective on the toe gripper, by a pressure-reducing valve adjustably controlled to vary preliminarily as desired the amount of such reduction of pressure. To compensate for the reduction of pressure, however, the piston and cylinder devices which operate the side grippers are of greater diameter than the device which operates the toe gripper, the proportions in fact being such that the side grippers are operated with greater force than the toe gripper. This construction further enables the operator readily to increase, if desired, the force of the pull applied to the upper by the side grippers after the machine has come to a stop with the upper held under tension, since all that is necessary to accomplish this is to cause the pressure-reducing valve to supply fluid under greater pressure to the side-gripper-operating devices, a hand lever being conveniently provided for this purpose. It is a further advantageous characteristic of the machine herein shown that automatic means is provided for controlling the pressure-reducing valve in such manner that the devices which operate the side grippers are subjected to the full force of the fluid in the accumulator when the grippers are opened to release the upper near the end of the operating cycle and also while they are being closed on the margin of an upper at the beginning of the next cycle, thus insuring that the grippers will be quickly withdrawn from positions where they might interfere with the tacking devices and will be quickly closed on the next upper. It will be evident that with respect to the use of fluid under increased pressure thus to operate upper-gripping means to grip an upper or to withdraw such means after the pulling of the upper, or with respect to variation in the pressure of the operating fluid after the pull to effect a variation in the pulling force applied to the upper, the invention is not limited in utility to the operation or control of side grippers.

In accordance with a further feature, the invention provides novel means whereby, with but little effort on the operator's part, the upper may be adjusted relatively to the last after the pull, the construction shown comprising means whereby the side grippers may be caused to move respectively in opposite directions to adjust or shift the upper laterally of the last. Such movements of the side grippers are effected by the operating fluid in response to suitable control of the valve mechanisms associated with the operating devices, the construction shown being such that in response to movement of a hand lever controlling these valve mechanisms the grippers may be made to shift the upper in one direction or the other as determined by the direction of the movement of the hand lever, the amount of such movements of the grippers to shift the upper in either direction being dependent upon the amount of movement imparted to the hand lever.

In order that adjustment of the upper may be more readily effected, the invention further provides novel means to cause the grippers to relax the force of their pull on the upper prior to the adjustment. For this purpose the machine herein shown is provided with a treadle by depression of which the valve mechanisms associated with the devices for operating the several grippers are moved in such manner as to cause these devices to impart to the grippers return movements the extent of which is dependent upon the amount of depression of the treadle, means being provided for preventing the treadle from being accidentally depressed far enough to cause the grippers to return completely to starting positions and to release the upper. When the operator releases the treadle after adjustment of the upper the fluid-operated devices act automatically to apply to the upper again a pull of the same force as before. If desired, in accordance with a further object of the invention, the treadle may be depressed far enough to cause the grippers to return completely and to release the upper, in case conditions require that the upper be rearranged in the gripper jaws and pulled a second time. This renders it unnecessary for the machine to complete its cycle before pulling the upper again. It will be understood that, as in the case of the above-described partial depression of the treadle merely to relax the force of the pull, release of the treadle by the operator causes the fluid-pressure means again to operate the grippers to pull the upper, the grippers in this instance being, of course, first closed on the upper by the action of the fluid-pressure means.

The above and other features of the invention, including also novel means whereby the force of the pull applied by the toe gripper to the upper may be adjustably varied, and various novel details of construction and combinations of parts, will now be more particularly described with reference to the acompanying drawings and thereafter pointed out in the claims.

In the drawings:

Fig. 3a is a view from the rear of a portion of the structure shown in Fig. 3;

Fig. 9 is a vertical sectional view showing mainly the cylinder and piston for operating the toe gripper;

Fig. 10 is a section on the line X—X of Fig. 3;

Fig. 11 is a detail view showing in side elevation on a larger scale certain parts which appear in Fig. 3;

Fig. 12 is a view in rear elevation of the parts shown in Fig. 11 and of parts associated therewith;

Fig. 13 is a plan view of certain parts shown in Fig. 4;

Fig. 14 is a view from the front of the machine illustrating the relation of the several grippers to one another and to the shoe rest; and Fig. 15 is a view in rear elevation of certain parts shown in Fig. 1.

The invention, as above stated, is herein illustrated as embodied in a modification of the type of machine disclosed in Letters Patent No. 1,510,851, which machine may, however, include features disclosed in other later Letters Patent, including Letters Patent No. 1,921,099, granted on August 8, 1933 on an application of W. T. B. Roberts. A machine of this type includes a shoe rest 2 (Fig. 14) on which the shoe is positioned bottom downward for the pulling-over operation, a toe gripper 4 for pulling over the upper at the end of the toe, and side grippers 6 for pulling over the upper at the opposite sides of the forepart, each of which side grippers may include a single pair of gripper jaws or, as sometimes heretofore and as herein illustrated, two pairs of jaws. The construction of these grippers may be assumed to be substantially as disclosed in Letters Patent No. 1,030,522, granted on June 25, 1912, on an application of R. F. McFeely, while features relating more particularly to the manner of spreading them apart for shoes of different sizes and for swinging them to pull the margin of the upper inwardly over the insole after the upper has been pulled heightwise of the last are more fully disclosed in Letters Patent No. 1,029,387. It will be understood further that machines of the illustrated type are provided with means (not herein shown) for clamping the sides of the shoe to hold it firmly after the upper has been subjected to a heightwise pull by the grippers, means for driving tacks upwardly to fasten the margin of the upper to the insole and last, and means for separating and delivering tacks to the driving devices.

Figure 1:
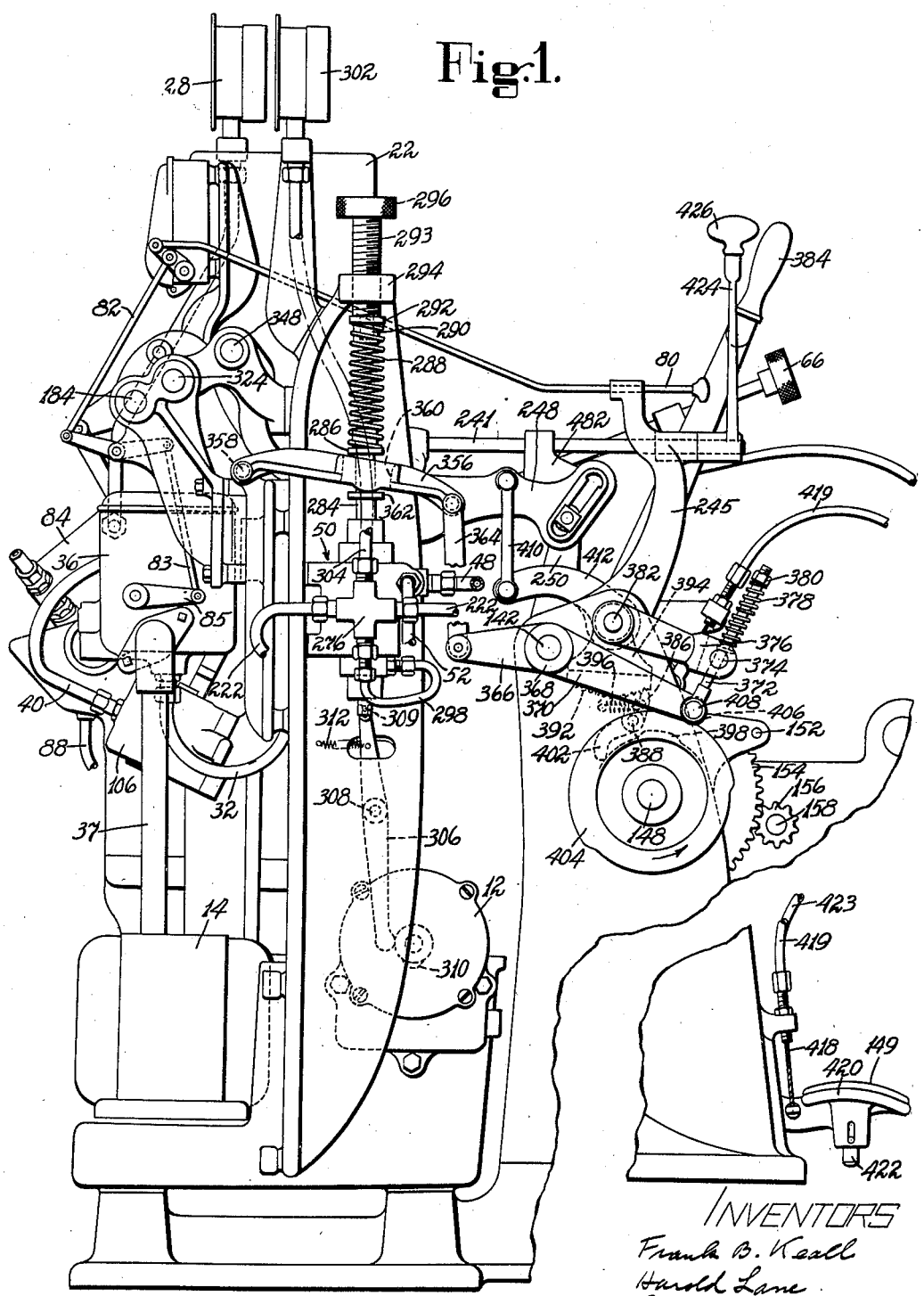
Fig. 1 is a view in left-hand side elevation, showing mainly gripper-operating mechanism applied to the left-hand side of a pulling-over machine of the previously mentioned type for purposes of the present invention.
Figure 2:
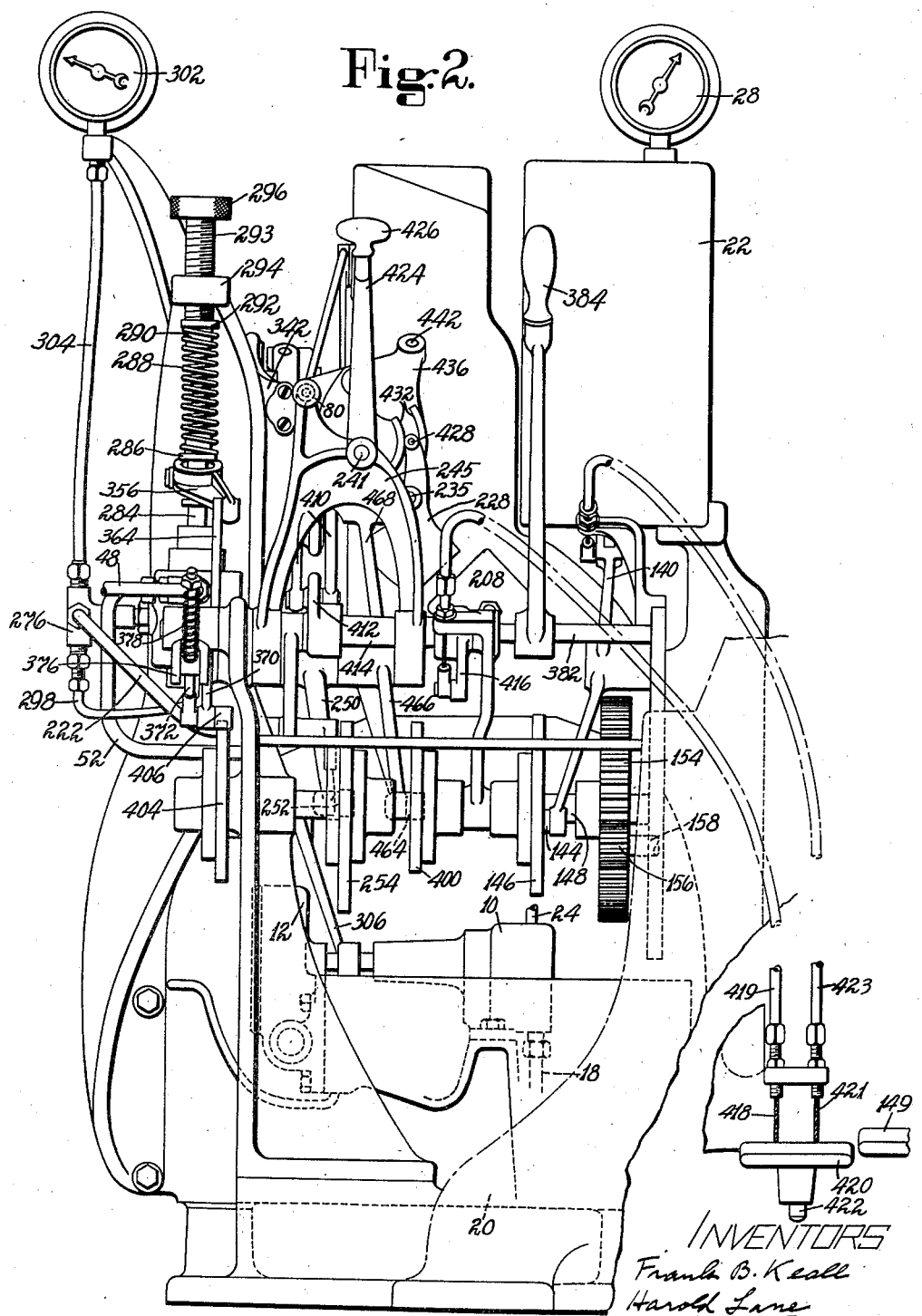
Fig. 2 is a view in front elevation of the parts shown in Fig. 1.
Figure 3:
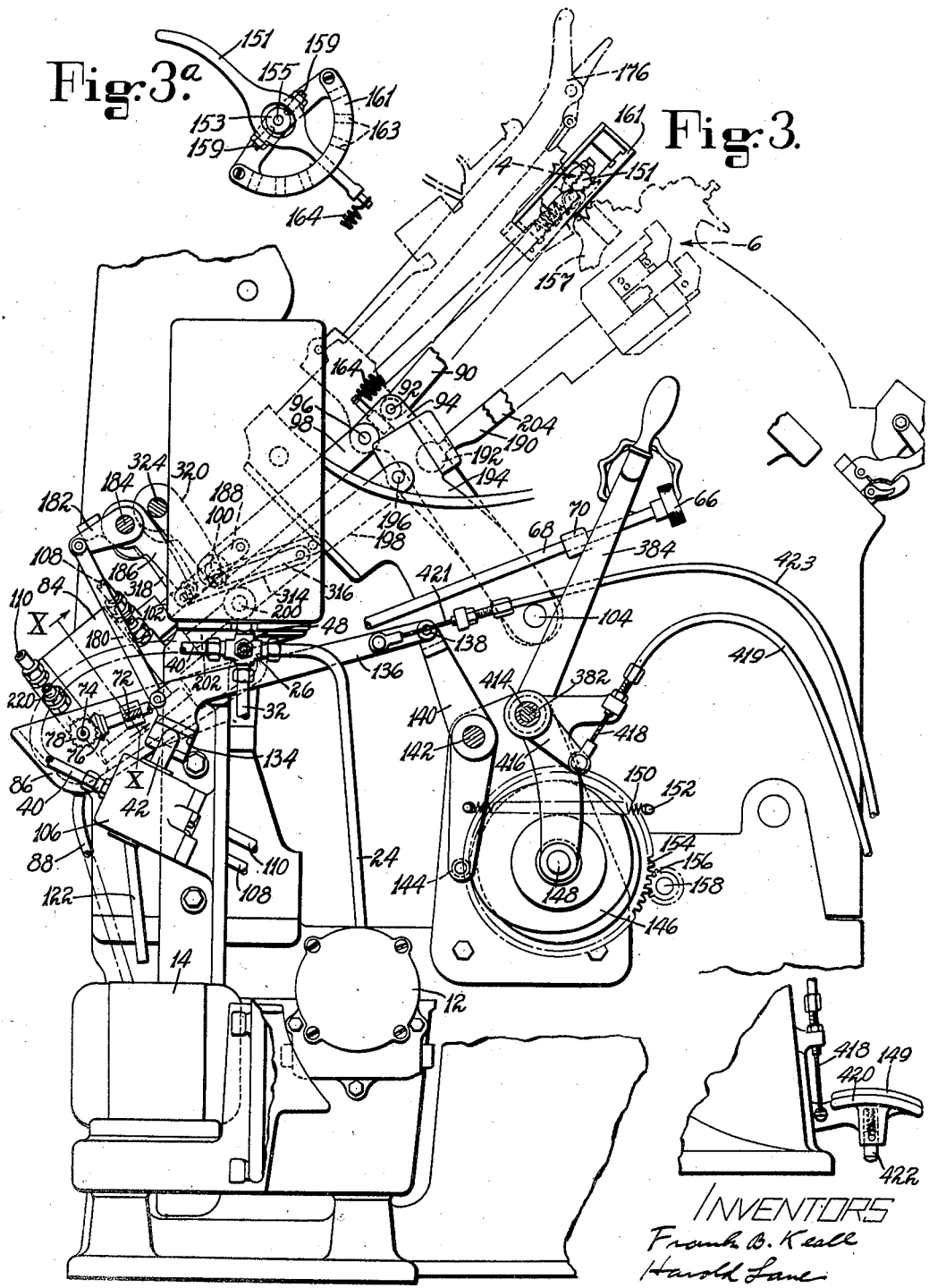
Fig. 3 is a view similar to Fig. 1, with parts broken away, showing portions of the structure in greater detail and also showing parts of the machine which do not appear in Fig. 1.
Figure 5:
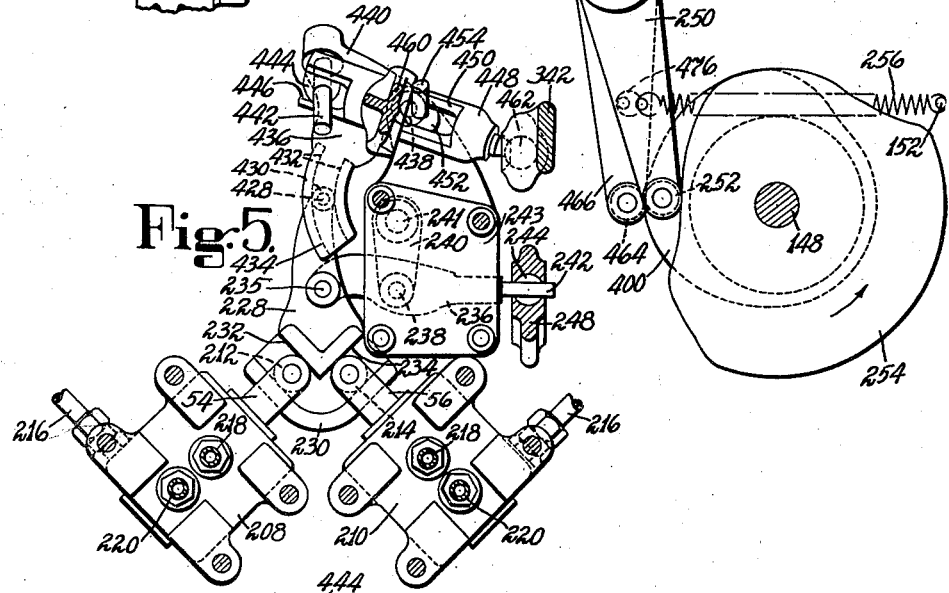
Fig. 5 is a view mainly in rear elevation of portions of the structure shown in Fig. 4, parts being broken away.
Figure 7:
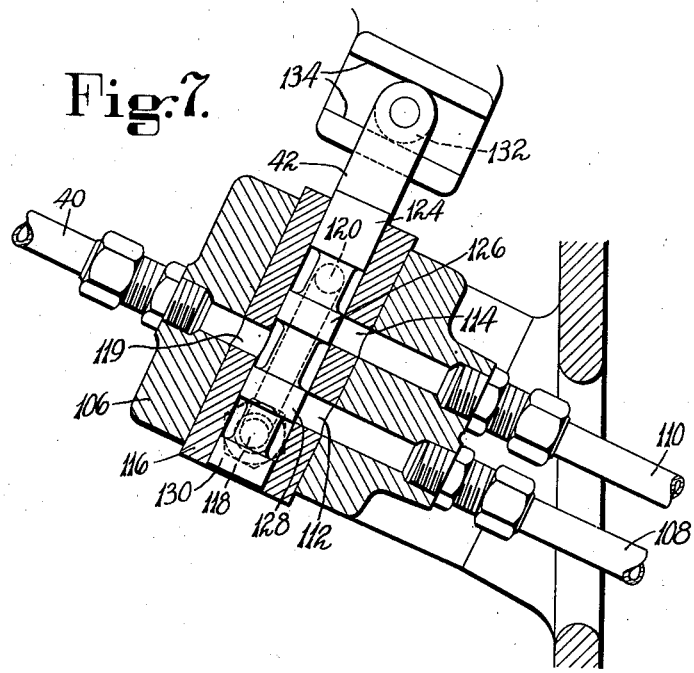
Fig. 7 is a vertical sectional view of one of the valve mechanisms with which the machine is provided for controlling flow of the operating fluid to and from one of the gripper-operating mechanisms.
Figure 8:
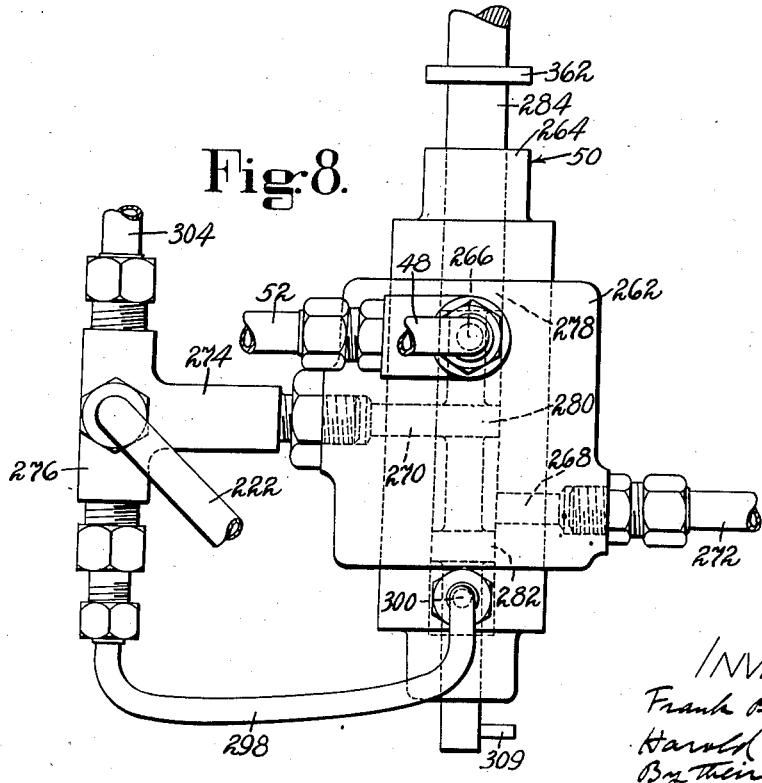
Fig. 8 shows in front elevation a pressure-reducing device included in the machine.

To accommodate and support parts provided by the present invention the frame of the machine, the main portion of which may be assumed to be similar to that of Letters Patent No. 1,510,851, is extended a substantial distance toward the left as viewed from the front of the machine. Supported on the frame is a gear pump 10 (Fig. 2) which may be of any well-known construction and is continuously driven through reduction gearing mounted in a casing 12 by an electric motor 14 (Fig. 3). The pump 10 draws oil through a filter (not shown) and a pipe 18 from an oil reservoir 20 and delivers oil to a pressure accumulator 22 through a pipe 24 and a five-way union 26 (Fig. 3) below the accumulator. The accumulator 22 contains air under pressure above the oil, so that the oil is under the influence of the compressed air. Through the five-way union 26 and a pipe 32 the accumulator is connected with a spring-controlled pressure relief valve 30 (Fig. 15) mounted in a casing 36 (Fig. 1) provided with an exhaust pipe 37 leading back to the reservoir 20. Leading also from the union 26 is a pipe 40 which conducts oil to a valve 42 (Fig. 7), this valve being arranged to control flow of oil to and from a cylinder 44 (Fig. 9) in which slides a piston 46 for operating the toe gripper 4. By means of a pipe 48 the union 26 further communicates with a pressure-reducing device 50 (Figs. 1 and 8) hereinafter described, this device also receiving oil directly from the pump 10 through a pipe 52. The pressure-reducing device 50 supplies oil, as hereinafter more particularly described, to valves 54, 56 (Fig. 5) controlling flow of oil to and from cylinders 58, 60 (Fig. 10) in which slide pistons 62, 64 for operating the side grippers 6. The pressure of oil supplied to the valve 42 and to the pressure-reducing device 50 is indicated by a gage 28 on the accumulator 22 and is determined by the relief valve 30 in the casing 36. This valve (Fig. 15) opens against the resistance of a controlling spring 34 and permits oil to escape from the pipe 32 through a passage 35 into the casing 36 and thence through the pipe 37 to the reservoir 20 when the pressure of the oil in the accumulator exceeds a predetermined maximum. The pressure of the oil may be varied by rotating, through a knurled head 66, a rod 68 (Fig. 3) which is loosely journaled near its front end in a bracket 70 on the frame and is journaled near its rear end in a bracket 72 mounted on an adjusting stem 74 (Fig. 15) for the spring 34, this stem being rotatable by the rod 68 through bevel gears 76 and 78. The stem is threaded in a bushing 79 and bears on a washer 81 engaging one end of the spring 34. As the stem is rotated it moves lengthwise to vary the pressure of the spring 34, the bracket 72 moving with it as required.

Figure 6:
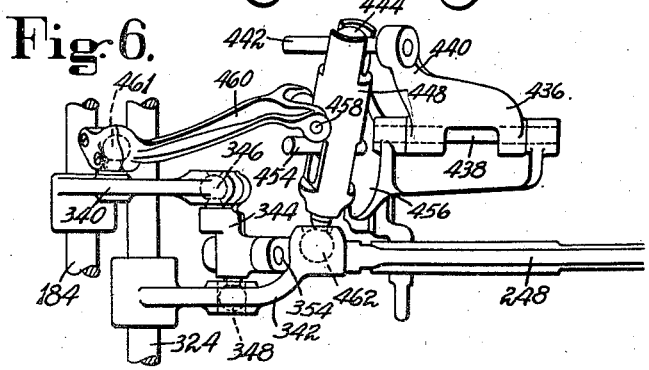
Fig. 6 is a plan view of certain parts shown in Fig. 4.

Within the casing 36 is means which permits the oil to escape freely from the accumulator 22 into the casing and thence by the exhaust pipe 37 to the reservoir 20 when the electric motor 14 is stopped, so as to guard against the possibility that when the machine is idle for a comparatively long time the compressed air in the accumulator may be absorbed by the oil to such an extent as to impair the efficiency of the system. This means is controlled by a rod 80 (Fig. 1) provided for starting and stopping the motor 14, through connections including members 82, 83 and 85, and is of substantially the same construction as means provided for the same purpose and shown in Fig. 6 of Letters Patent No. 2,097,567, granted on November 2, 1937 on an application of F. B. Keall. It will be understood that when the motor is stopped by movement of the rod 80 in one direction the oil is permitted to escape from the accumulator 22 through the casing 36 and the exhaust pipe 37, and that when the motor is started by movement of the rod in the opposite direction communication with the casing 36 is interrupted so that oil is again forced into the accumulator and the air above the oil therein is compressed.

The three previously mentioned cylinders 44, 58 and 60 (Figs. 9 and 10) are all formed in a cylinder block 84 (see also Fig. 3) mounted on a bracket 86 fast on the frame, this bracket being so formed as to catch any oil which may escape from the cylinders. Any such oil will be returned to the reservoir through a pipe 88. The three cylinders are parallel to one another and are substantially in line with the respective toe and side grippers. The toe gripper 4 includes a bar 90 (Fig. 3) through which, as is common in machines of the illustrated type, it is first closed on the upper and is then moved downwardly to pull the upper, and in the construction herein shown the lower end of this bar is pivotally connected by a pin 92 to the upper end of a link 94 mounted as hereinafter described. Pivotally connected also to the upper end of this link by a pin 96 is the upper end of a link 98 which at its lower end is pivotally connected at 100 to the upper end of a piston rod 102 integral with the piston 46 (Fig. 9). The pivotal connection of the bar 90 to the link 94 permits the toe gripper to swing in directions lengthwise of the shoe as required in the course of the operation of the machine. The link 94 extends downwardly and at its lower end is freely mounted on a fixed rod 104, so that the link 94 serves to guide the lower end of the bar 90 during movements of the piston 46. It will be understood that the toe gripper and the side grippers are guided during their downward and upward movements by gripper-spreading means of substantially the same character as disclosed in Letters Patent No. 1,029,387, and that under control of this spreading means in the second stage of the cycle of operations of the machine the grippers are caused to swing inwardly under the shoe coincidently with inward swinging movements of devices which wipe the margin of the upper over the insole and thereafter drive tacks to fasten the upper.

Surrounding the previously mentioned valve 42 (Fig. 7) which controls the flow of oil to and from the cylinder 44 is a casing 106 which is secured to the frame and is in communication with the upper and lower ends of the cylinder 44 through pipes 108, 110 opening into ports 112, 114 formed in a sleeve 116 fast in the casing 106. This sleeve is provided with exhaust ports 118, 120 communicating with an exhaust pipe 122 (Fig. 3) leading to the reservoir 20, and with an inlet port 119 communicating with the previously mentioned supply pipe 40. The valve 42 comprises pistons 124, 126, 128 and 130 in fixed relation to one another and so arranged as to permit communication between certain of the above-mentioned ports, the ports in communication with each other depending upon the position of the valve in the sleeve 116. The valve extends upwardly and is provided on its upper end with a roll 132 lying in a groove 134 which is substantially perpendicular to the axis of the valve and is formed in the rear-end portion of a forwardly and rearwardly extending link 136 (Fig. 3). This link is connected at its front end by a pivot pin 138 to the upper end of a cam-operated lever 140 which is pivotally mounted substantially midway between its upper and lower ends on a horizontal shaft 142 and is provided at its lower end with a roll 144 engaged by the periphery of a cam 146 on a cam shaft 148. The roll 144 is held in engagement with the cam 146 by a spring 150 connected to the lever 140 and to a rod 152 held rigidly in the frame. The cam shaft 148 is rotated through gearing 154, 156 from a shaft 158 which, through connections not shown, is driven by a bevel gear corresponding to the gear 118 shown in Letters Patent No. 1,510,851, the construction being such that the shaft 148 receives one complete rotation in each cycle of operations of the machine. It will be understood that, in accordance with the disclosure of the above-mentioned Letters Patent, the machine is provided with a clutch which is tripped by the operator by means of a treadle 149 to start the cycle of operations and is controlled automatically to bring the machine to a stop at a point in the cycle after the upper has been pulled and while it is being held under tension by the grippers. When the clutch is again tripped the machine completes its cycle of operations, the previously mentioned shoe clamping, wiping and tacking means being operated by clutch-driven mechanisms.

The contour of the cam 146 is such that shortly after the beginning of the rotation of the shaft 148 the spring 150 is permitted to swing the lever 140 in a counter-clockwise direction (Fig. 3) and thus to move the link 136 in a rearward direction. This causes the valve 42 to be thrust downwardly to a position in which it permits oil under pressure to flow from the inlet port 119 through the port 112 and the pipe 108 and to enter the cylinder 44 through a port 160 (Fig. 10) above the piston 46, a port in the cylinder below the piston being at this time in communication with the exhaust pipe 122 through the pipe 110 and the ports 114, 120. This causes the toe gripper first to close and then to move downwardly to apply a pull heightwise of the last to the toe end of the upper. Preferably, as shown, the periphery of the cam 146 is of such contour as to cause the toe gripper to apply a pull to the upper before the upper is pulled as hereinafter described by the side grippers, and then through control of the valve 42 to cause oil to be admitted below the piston 46 so that the toe gripper rises to relax the force of its pull on the upper as the side grippers are about to apply their pull to the side portions of the upper. The manner of control is further such that the toe gripper is then caused to move downwardly with the side grippers to apply its pull again to the toe end of the upper as the side grippers pull the upper. This "give and take" action of the toe gripper facilitates the proper shaping of the forepart of the upper to the top of the last. It will be observed that the diameter of the cylinder 44 is considerably less than that of the cylinders 58 and 60, in consequence of which the force of the pull exerted by the toe gripper on the upper is less than that exerted by the side grippers, notwithstanding the fact that oil under a reduced pressure is supplied to the cylinders 58 and 60 as hereinafter described.

It is desirable that the operator be able to exercise some control over the force of the pull applied to the upper by the toe gripper. With this object in view, the upper-pulling movement of the gripper effected by the fluid-pressure means above described is resisted yieldingly by a spring 164 connected at its lower end to the swinging link 94 and at its upper end to one end of a hand lever 151 (Fig. 3a). The hand lever has formed in it midway of its length an opening in which lies a collar 153 mounted to turn on a fixed pin 155 extending from a bracket 157 (Fig. 3) fast on the frame. Diametrically opposite pivot screws 159 in the hand lever extend into recesses in the collar 153 to permit lateral swinging movements of the hand lever. The hand lever is held against movement about the pin 155 in any one of a plurality of different positions by means of a quadrant 161 on the bracket 157, this quadrant being provided with a series of notches 163 to receive the hand lever. To adjust the tension of the spring 164 the hand lever is swung by the operator about the axes of the pivot screws 159 to free it from one of the notches and is then swung about the pin 155 to a position determined by another one of the notches. The machine is also provided with a hand lever 176 through which the operator may directly move the toe gripper heightwise of the last in the same manner as in prior machines of the illustrated type, this lever being rigidly mounted on the link 94.

While the toe gripper is moving downwardly to pull the upper in response to the valve-opening movement of the cam lever 140, mechanism which is movable as determined by the movement of the gripper tends to close the valve 42 again in opposition to the tendency of the progressive movement of the cam lever further to open it. In this manner, by restricting the admission of fluid to the cylinder 44, the speed of the movement of the gripper may be rendered gradual, as determined by the speed of the movement of the lever 140, so that there will be no tendency to tear or otherwise damage the upper as might be the case if the oil were admitted suddenly through a widely opened passage to the cylinder. For the purpose in view there is pivotally connected to the rear end of the link 136 controlling the valve 42 an upwardly extending link 180 (Fig. 3) substantially perpendicular to the link 136, the upper end of the link 180 being connected to a short rearwardly extending arm 182 mounted on a shaft 184, this arm extending substantially parallel to the link 136. The arm 182 is free to turn about the shaft 184, as is also another downwardly and forwardly extending arm 186. A bar 183 (Fig. 12) connects the arm 182 rigidly to a collar 185 rotatable on the shaft 184, and this collar is connected yieldingly by a torsion spring 187 to the arm 186. At its lower end the arm 186 is connected by a link 188 (Fig. 3) to the previously mentioned link 98 connected to the gripper bar 90. Accordingly, as the gripper is moved in a downward direction the arm 182 is swung in a clockwise direction (Fig. 3) and thus raises the rear end of the valve-controlling link 136, the link being swung upwardly about its pivotal connection to the lever 140. By this movement, therefore, the arm 182 tends to move the valve 42 upwardly in the direction to close it as the cam lever 140 tends to move it downwardly in the direction to open it wider after it has once been opened by the initial movement of the cam lever. It will be understood that when the resistance of the upper balances the upper-pulling force applied to the gripper by the fluid-pressure means the gripper comes substantially to a stop, after which the cam lever 140 continues its movement in the valve-opening direction far enough to insure that the piston 46 will be subjected to the full pressure of the oil in the accumulator 22.

The gripper for pulling the upper at the left-hand side of a shoe presented to the machine includes a bar 190 (Fig. 3), corresponding to the previously mentioned bar 90 of the toe gripper, this bar being connected by a ball-and-socket joint 192 to the upper end of a link 194 to which is pivoted at 196 a link 198 pivotally connected at 200 to the upper end of a piston rod 202 secured to the piston 62 (Fig. 10) in the cylinder 58. The right-hand side gripper includes a similar bar 204 which is connected by similar mechanism, including another link 194, to a piston rod 206 secured to the piston 64 in the cylinder 60. Each of the links 194 is mounted to swing about the rod 104 and serves the same purpose as the link 94 associated with the mechanism for operating the toe gripper.

Figure 4:
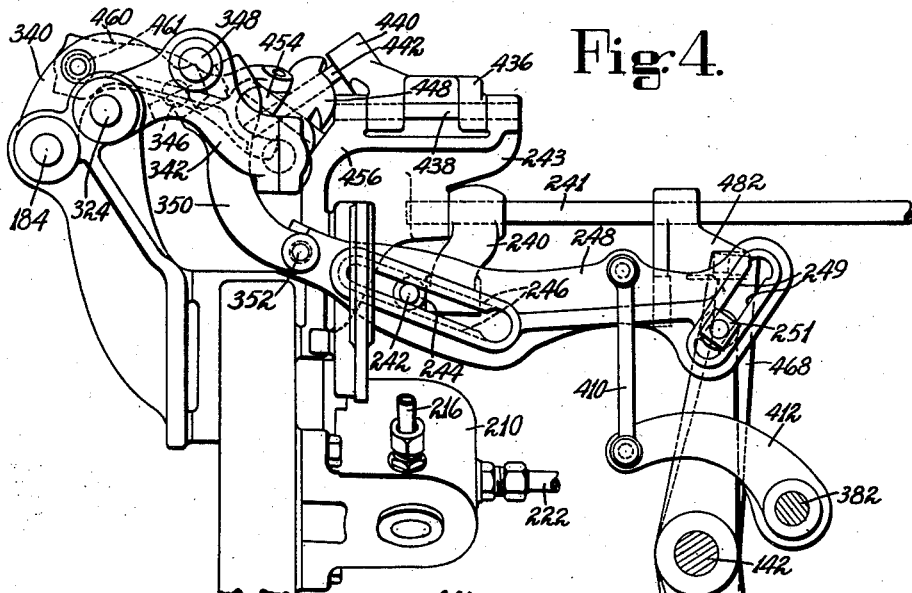
Fig. 4 is a view in left-hand side elevation of certain valve-controlling mechanism with which the machine is provided.

Secured to the frame of the machine are two valve casings 208, 210 (Fig. 5) in which slide the piston valves 54 and 56 controlling the flow of oil to and from the cylinders 58 and 60, respectively, these piston valves being similar to the previously mentioned piston valve 42 associated with the toe-gripper-operating mechanism. As viewed from the rear of the machine the valve casings 208, 210 are each inclined upwardly and inwardly at an angle of 45° to the vertical, and the valves 54 and 56 have upwardly extending stems which carry rolls 212, 214. It will be understood that in each of the valve casings 208, 210 is a sleeve similar to the sleeve 116 shown in Fig. 7 and similarly provided with exhaust ports communicating through a pipe 216 with the reservoir 20, an inlet port, and ports communicating respectively through pipes 218, 220 with the upper and lower ends of the cylinder 58 or 60 associated therewith. Each inlet port is supplied with oil through a pipe 222 (Figs. 1, 4 and 8) leading from the pressure-reducing device 50. It will be understood that each of the piston valves 54, 56 is provided with four pistons arranged similarly to the four pistons of the valve 42 shown in Fig. 7.

A single valve-controlling lever 228 (Fig. 5) is provided for controlling both the valves 54, 56 simultaneously, so that the opposite side grippers will be operated in unison. This lever is substantially vertical and has a spear-shaped lower end 230 provided with grooves 232, 234 in which lie the previously mentioned rolls 212, 214. The grooves extend upwardly and outwardly from each other at an agle of 45° to the vertical and therefore lie perpendicular to the axes of the respective valves 54, 56. Normally the lever 228 is supported in such a position that the valves 54, 56 are in closed positions, preventing the admission of oil to the cylinders 58, 60. Bodily downward movement of the lever 228 serves to depress the valves and thus to open communication between the oil supply and the upper ends of the cylinders 58, 60 to cause the piston 62, 64 to move downwardly and thus to operate the side grippers to grip and pull the upper. For thus moving the lever 228 downwardly, after the starting of the power operation of the machine, the lever is pivotally supported between its upper and lower ends by a pin 235 on the left-hand end of a laterally extending lever 236, as the parts are viewed from the rear in Fig. 5. The lever 236 is pivoted, substantially midway between its ends, on a pin 238 supported on the lower end of an arm 240 which is secured to a rock shaft 241 hereinafter more particularly described, this rock shaft being mounted in brackets 243, 245 (Figs. 1 and 5) secured to the machine frame. The right-hand end of the link 236 (Fig. 5) has a pin 242 extending from it, and on this pin is slidingly mounted a ball 244 lying in an upwardly and rearwardly inclined slot 246 (Fig. 4) formed in a forwardly and rearwardly extending cam-operated link 248. The rear end of the link 248 is supported in a manner hereinafter described, and its front end is connected, also in a manner to be described, to the upper end of a cam-operated lever 250 pivotally mounted substantially midway between its upper and lower ends on the previously mentioned shaft 142. At its lower end this lever carries a roll 252 engaged by the periphery of a cam 254 on the cam shaft 148, the roll being held in engagement with the cam by a spring 256 connected to the lever 250 and the rod 152.

The front end of the link 248 is provided with a forwardly and upwardly extending slot 249 in which is slidingly mounted a block 251 pivoted on the upper end of the lever 250. This permits the front end of the link to be moved upward or downward relatively to the lever 250 by means and for a purpose hereinafter described. When the upper end of the lever 250 is moved forwardly, i. e., toward the right as the parts are viewed in Fig. 4, by the cam 254, the link 248 is moved bodily forward and by reason of the inclination of the slot 246 therein raises the right-hand end (Fig. 5) of the lever 236, so that the valve-controlling lever 228 on the other end of the lever 236 is moved bodily downward. This serves to depress both the valves 54, 56 to cause oil under pressure to flow to the upper ends of the cylinders 58, 60 through ports 258 (Fig. 10) and to move the pistons 62, 64 downwardly to cause the side grippers to grip and pull the upper. It will be understood that at this time the lower ends of the cylinders 58, 60 are open to the exhaust.

The amount of force thus applied by the side grippers in pulling the upper depends upon the pressure of the oil supplied to the cylinders 58, 60 through the pressure-reducing device 50. This device serves to reduce variably the pressure of the oil admitted to the cylinders 58, 60, as compared with the pressure in the accumulator 22, so that the amount of force applied to the upper by the side grippers may be varied as desired independently of that applied by the toe gripper.

The pressure-reducing device 50 (Fig. 8) comprises a casing 262 in which is a sleeve 264 provided with an inlet port 266, an exhaust port 268 and an outlet port 270. The inlet port 266 is in communication with the previously mentioned pipes 48 and 52 leading respectively from the accumulator 22 and the pump 10. The exhaust port 268 is in communication through a pipe 272 with the oil reservoir 20, and the outlet port 270 communicates through a pipe 274 with a four-way union 276 from which lead the pipes 222 to the inlet ports controlled by the valves 54, 56. Slidingly mounted in the sleeve 264 are pistons 278, 280 and 282 which are parts of a piston valve 284 provided with a flange 286 (Fig. 1) engaged by the lower end of a spring 288, the valve 284 serving as a pressure-reducing valve. The upper end of the spring 288 surrounds a sleeve 290 and abuts against a flange 292 on the sleeve. The sleeve 290 is loosely mounted on the lower end of an adjusting screw 293 threaded in a bracket 294 fast on the frame, the screw being provided with a knurled head 296 by which it may be turned to vary the amount of compression of the spring 288. The outlet port 270 is also in communication, through the four-way union 276 and a pipe 298, with a port 300 in the sleeve 264 just below the piston 282. Oil at high pressure is supplied from the pump and the accumulator through the port 266 and the oil may flow from there through the outlet port 270 when the spring 288 holds the valve 284 far enough depressed to open communication between these ports. The pressure of the oil supplied through the port 270 to the cylinders 58 and 60 is also effective on the lower end of the piston 282 with a tendency to raise the valve 284 and close the port 270. It will be understood that in the operation of the side grippers the pressure of the oil in the cylinders 58 and 60 builds up until it is sufficient thus to raise the valve 284, at which time the pressure is still considerably less than that in the accumulator. The valve 284 accordingly acts as a floating valve to supply oil through the port 270 at a reduced operating pressure dependent upon the amount of compression of the spring 288. Any oil which may leak past the pistons 280, 282 or which may escape at any time through the port 270 by reason of upward movement of the piston 280 is returned to the reservoir through the pipe 272. The pressure of the oil supplied through the port 270 is indicated by a gage 302 in communication through a pipe 304 with the four-way union 276.

In order to obviate any tendency for the pressure-reducing valve 284 to stick in the sleeve 264, the valve is extended downwardly below the sleeve and is oscillated by means of a lever 306 (Fig. 1) pivotally mounted on a pin 308 on the frame. The upper end of the lever is forked to embrace loosely a pin 309 projecting from one side of the valve 284, and its lower end is arranged to be acted upon by a cam 310 on the pump shaft. A spring 312 connected to the lever serves to swing it in one direction and maintains it in position to be swung in the other direction by the cam.

As in the case of the piston 46 for operating the toe gripper, it is desirable that the pistons 62, 64 for operating the side grippers shall move gradually downward at a speed depending upon the speed of the movement of the cam lever 250. With this in view, the two links 198 (Fig. 3) connected to the side grippers are connected respectively by links 314, 316 to arms 318, 320 (Figs. 11 and 12) loosely mounted, respectively, on the previously mentioned shaft 184 and on a shaft 324, the arms being yieldingly coupled to these shafts by torsion springs 326, 328 connected to collars 330, 332 fast on the shafts. The shafts 184, 324 extend laterally of the machine and by the above-described connections are rocked in a clockwise direction, as viewed in Fig. 3, as the side grippers move downwardly to pull the upper. Secured respectively to the rock shafts 184, 324 are arms 340, 342 (Figs. 4 and 6) which project forwardly from them. A short link 344 extends across between the arms 340, 342 and is connected to them at its opposite ends by ball joints 346, 348. A downwardly and forwardly extending link 350 is pivotally connected at its lower end by a pin 352 to the rear end of the slotted link 248 and thus supports this end of the link 248 during its lengthwise movements, the upper end of the link 350 being connected by a pin 354 to the link 344 extending between the arms 340, 342.

By reason of this arrangement, as the front ends of the arms 340, 342 are lowered in response to downward movements of the side grippers, the rear end of the link 248 is lowered while the link is being moved progressively in a forward direction by the cam lever 250. The lowering of the rear end of the link 248 tends to lower the right-hand end (Fig. 5) of the lever 236 at the same time that the forward movement of the link tends to raise this end of the lever. Accordingly, the tendency of the lever 236 further to open the valves 54, 56 in response to the progressive forward movement of the link 248 is counteracted by the lowering of the rear end of the link, so that fluid is caused to flow at a substantially constant rate into the cylinders 58, 60. It will be understood that the lowering of the rear end of the link 248 does not begin until slightly after the beginning of the forward movement of the link, due to the time-lag before the pistons start to move, thus permitting the valves 54, 56 to be opened sufficiently to admit the oil as required to the upper ends of the cylinders 58, 60. After the side grippers have come substantially to a stop by reason of the resistance of the upper to the force of the pull, the link 248 moves a little farther forwardly to open the valves wider and thus insure that the grippers will be subjected fully to the predetermined pressure of the operating fluid. As in the case of the mechanism which operates the toe gripper, the valves controlling the operation of the side grippers remain open after the completion of the pull on the upper, so that the grippers may maintain the upper under unrelaxed tension. By suitable adjustment of the spring 288 controlling the pressure-reducing valve 284 the side grippers may be made to apply to the upper an amount of force most appropriate for upper materials of any particular character.

It is desirable that after the machine has come to a stop at the end of the automatic upper-tensioning movements of the grippers, the operator may be able to cause the side grippers to exert a further strain on the upper if that seems to be necessary. This has been accomplished heretofore by forcing the side grippers manually farther in the direction of their pull on the upper. The machine herein shown is so constructed that the considerable amount of effort thus required heretofore is rendered unnecessary, the desired result being accomplished merely by movement of the pressure-reducing valve 284 in a direction to permit greater pressure to be applied to the piston 62 and 64. For this purpose a lever 356 (Fig. 1) pivotally mounted on a pin 358 near the rear of the machine extends forwardly and is provided with a slotted portion 360 which engages the top surface of a flange 362 on the valve 284. The lever 356 is pivotally connected at its front end to a link 364 the lower end of which is pivotally connected to the rear arm 366 of a lever 368 mounted to swing on the previously mentioned shaft 142. A forwardly extending arm 370 of the lever 368 has pivotally connected to its front end a rod 372 extending upwardly through a bore in a pin 374 which is mounted to turn in the front bifurcated end portion of an arm 376 above and substantially parallel to the arm 370. Above the pin 374 the rod 372 has thereon a spring 378 confined by a nut 380 on the upper end of the rod. The arm 376 is fast on a shaft 382 on which is secured an upstanding hand lever 384. Rearward swinging movement of the hand lever 384 accordingly serves through the spring 378 to force the lever 356 in a downward direction and thus add to the force applied by the spring 288 to the reducing valve 284, the result being that the valve is moved downwardly against the pressure of the oil acting on the lower face of the piston 282 and oil under a greater degree of pressure is introduced above the pistons 62, 64 to increase the force of the pull of the side grippers on the upper. It will be evident that when the pressure of the oil acting on the pistons 62, 64 becomes great enough to overcome the forces of both springs 288 and 378 by reason of the pressure on the piston 282, the valve 284 is lifted again to close the port 270. Accordingly, the amount of additional force applied to the side grippers depends upon the amount of movement imparted by the operator to the hand lever 384 and the resulting increase in compression of the spring 378. When the operator considers that the upper has been pulled with sufficient force, he ceases to urge the hand lever rearwardly and the pistons are maintained in their further lowered positions by the oil above them, a simple pawl-and-ratchet mechanism being provided to retain the hand lever in any position to which it may be moved. This mechanism comprises a pawl 386 fast on a small rock shaft 388 which is mounted to turn in the frame, the pawl being arranged to engage teeth 392 on a segment arm 394 secured to the shaft 382. The pawl 386 is held normally in engagement with the teeth 392 by a spring 396. The pawl is disengaged from the teeth early in the next operating cycle of the machine, before the side grippers begin their upper-pulling movement, by means of a cam 398 on the cam shaft 148, this cam engaging an arm 402 fast on the shaft 388.

The machine is further provided with automatic means for moving the pressure-reducing valve 284 positively in a downward direction early in the second stage of the operating cycle of the machine, so that the side grippers will be moved quickly downward out of the way of the tackers when they are opened in the usual manner to release the upper by the swinging movements of the tacker arms inwardly underneath the shoe. For this purpose there is secured to the cam shaft 148 a cam 404 the periphery of which is arranged to engage a roll 406 mounted on a pin 408 on the front end of the arm 370 of the lever 368. It will thus be seen that the cam 404 acts on a portion of the same mechanism which is operated by the hand lever 384 when this lever is used. Rapid movement of the pistons 62, 64 to the lower ends of their cylinders at this time is insured by reason of the fact that the valves 54, 56 have already been opened to a substantial extent by the action of the cam lever 250 near the end of the upper-pulling movement of the side grippers, the roll 252 on the lever being engaged at this time by a concentric portion of the cam 254. Since the valves are already open to such an extent the movement of the grippers out of the way of the tackers is not substantially retarded by the tendency for the valves to be closed again as the grippers receive such movements. The roll 406 continues to be engaged by a concentric high portion of the cam 404, so that oil of the same relatively high pressure as that in the accumulator 22 is supplied to the valves 54, 56, through the remainder of the cycle of operations of the machine in the course of which the side grippers are returned to their initial positions by oil admitted below the pistons 62, 64, and also during the early portion of the first stage of the next cycle of the machine while the gripper jaws are being closed to grip the upper, thus insuring a quick gripping of the upper. Before the side grippers begin to move downwardly, however, to tension the upper the roll 406 rides off the high portion of the cam 404, the cam 398 having disconnected the pawl 386 from the teeth 392 as hereinabove described, so that the pressure of the oil which acts to impart upper-pulling movements to the side grippers is determined by the reducing valve 284.

In order to adjust the upper, if necessary, widthwise of the last after the pull has been applied thereto, the machine is provided with means whereby the force of the pull of the side grippers on the upper may first be relieved and whereby oil may then be admitted below one of the pistons 62, 64 and above the other to cause the pistons to be moved respectively in opposite directions. For this purpose the link 248 near its front end is pivotally connected to the upper ends of a pair of substantially vertical links 410 (Figs. 2 and 4) which normally support the front end of the link 248 at such a height that the block 251 pivotally connected to the lever 250 lies near the lower end of the slot 249. The links 410 are pivotally connected at their lower ends to an arm 412 projecting from a bushing 414 (Fig. 3) rotatable on the shaft 382, this bushing having projecting from it a second arm 416 to which is connected one end of a wire cable 418 mounted in a guide 419, the other end of the cable being connected to a treadle 420 pivotally mounted on the base of the frame. It will thus be seen that by depression of the treadle 420 the link 248 may be swung downwardly about its connection with the link 350 and that in response to this swinging movement the link 248 is moved bodily in a rearward direction by the action of the block 251 thereon in the inclined slot 249. Such rearward movement of the link causes it to swing the lever 236 in the direction to lift the lever 228 (Fig. 5), thus causing the two valves 54, 56 to move into positions in which they permit oil to enter the cylinders 58, 60 under the pistons 62, 64 and to move the side grippers upwardly to relieve the force of their pull on the upper. Since the previously described connections for controlling the valves 54, 56 by the movements of the side grippers are effective when the grippers are moved upwardly as well as when they are moved downwardly, the amount of upward movement which the grippers receive is dependent upon the amount of downward movement imparted to the treadle 420, the grippers continuing to rise while the treadle is being depressed and ceasing their upward movement substantially as soon as the downward movement of the treadle ceases. That is, as the grippers move upwardly the connections between their operating links 198 and the rear end of the link 248 cause the latter to swing in an upward direction with a tendency to return the valves 54, 56 to their neutral or closed positions while the rearward movement of the link due to depression of the treadle is tending further to open them. When such rearward movement of the link 248 ceases the slight further upward movement of the pistons 62, 64 which thereafter occurs causes the valves immediately to close. The treadle 420 is also connected by another wire cable 421 in a guide 423 to the front end of the link 136 controlling the valve 42 associated with the toe-gripper-operating mechanism, so that the toe gripper is made to move upwardly to relax the force of its pull on the upper simultaneously with the side grippers as a result of forward movement imparted to the valve-controlling link 136. It will be understood that the toe gripper is at this time controlled in precisely the same way as the side grippers and comes to a stop substantially as soon as depression of the treadle 420 ceases. When forward movement is imparted to the link 136 by the treadle the cam lever 140 swings idly away from the cam 146 against the resistance of the spring 150 which later returns it upon release of the treadle. Spring means (not shown) also yieldingly opposes the swinging of the arm 416 by the treadle and returns the arm to its normal position upon release of the treadle.

The treadle 420 is provided with a spring-controlled plunger 422 arranged to engage the floor and thus to guard against accidental movement of the treadle far enough to cause the gripper bars 90, 190 and 204 to be raised to such an extent as to open the gripper jaws and release the upper. By movement of another hand lever 424, while holding the treadle more or less depressed, the operator may cause the gripper at one side of the shoe to rise and the gripper at the other side to descend, so as to adjust the upper laterally of the last in the manner required, the direction in which the upper is thus adjusted or shifted depending upon the direction of the movement of the hand lever. The hand lever 424 is provided at its upper end with a hand grip 426 for operating it, and it is mounted fast on the front end of the rock shaft 241 to which is secured, as hereinbefore described, the arm 240 (Fig. 5) supporting the valve-controlling lever 236. It will accordingly be evident that when the hand lever 424 is swung toward the right the valve-controlling lever 236 is moved bodily toward the left, and that when the hand lever is swung toward the left the lever 236 is moved bodily toward the right. Such bodily movement of the lever 236 in either direction serves to swing the substantially vertical valve-controlling lever 228 in the same direction about an axis at its upper end to cause it simultaneously to move one of the valves 54, 56 downward and the other valve upward, as will be evident by reference to Fig. 5, the manner in which the lever 228 is controlled at its upper end being hereinafter described. This causes oil to be admitted below one of the pistons 62, 64 and above the other piston to move the side grippers respectively in opposite directions as required. After the adjustment of the upper the operator releases the treadle 420, whereupon the grippers again pull the upper with the same force as prior to the adjustment by reason of the return movements of the cam lever 140 and the arm 416.

The machine is further provided with controlling mechanism such that the amount of adjusting movement thus imparted to the side grippers depends upon the amount of movement imparted by the operator to the hand lever 424, the grippers coming to rest substantially as soon as the movement of the hand lever ceases. For this purpose the upper end of the substantially vertical valve-controlling lever 228 (Fig. 5) is provided with a stud 428 on which is mounted a roll 430 lying in a curved slot 432 formed in a depending arm 434 of a lever 436, this lever being pivotally mounted on a forwardly and rearwardly extending rod 438 (Figs. 4, 5 and 6) located above and somewhat to the left, from the point of view of the operator, of the valve-controlling lever 228. The slot 432 is so arranged as to permit such short upward or downward movement as the lever 228 receives in the automatic operation of the machine without any substantial swinging movement of the lever about the pivot 235, and to permit the lever 228 to be swung by movement of the lever 436 without shifting of the roll 430 to any substantial extent along the slot 432. When the lever 228 is moved as above described by the hand lever 424 it swings about the axis of the stud 428 which is stationary at that time. Since the lever 228 is pivoted at 235 between its upper and lower ends, the lower end of the lever may be returned to its normal central position to terminate the relative movement of the opposite side grippers by moving the upper end of the lever in the same direction that its lower end is moved by the hand lever 424. For thus controlling the lever 228, so that the side grippers will come to a stop when the movement of the hand lever 424 ceases, swinging movement in the proper direction is imparted to the lever 436 simultaneously with the movements of the grippers. In addition to its depending arm 434 the lever 436 is provided with a laterally extending arm 440 which carries a pin 442 extending rearwardly and downwardly from it, and this pin has slidingly mounted thereon a ball 444 which lies in a slot 446 formed in the right-hand end of a bar 448. The pin 442 extends at an angle of substantially 45° to the horizontal. About midway of its length the bar 448 has therein a second slot 450 in which is mounted a ball 452, and extending upwardly and rearwardly through a hole in this ball, at an angle of substantially 35° to the horizontal, is a pin 454 fixed in a bracket 456 on the frame. Also substantially midway of its length the bar 448 has pivoted to it at 458 the front end of a rearwardly extending link 460 which at its rear end is connected to the previously mentioned arm 340 on the rock shaft 184 by means of a ball-and-socket joint 461. By reference to Fig. 4 it will be seen that the connection between the link 460 and the arm 340 is above the shaft 184, so that swinging movement of the arm causes the link to move in a lengthwise direction. The left-hand end of the bar 448 is connected by a ball joint 462 to the arm 342 on the rock shaft 324, the arrangement being such that in response to upward or downward swinging movement of this arm the left-hand end of the bar 448 is raised or lowered. Accordingly, when the opposite side grippers are moved upwardly in unison, accompanied by swinging movements of the arms 340, 342 in a counterclockwise direction (Fig. 4) as hereinbefore described, the left-hand end of the bar 448 is raised by the arm 342 and the link 460 is moved in a rearward direction by the arm 340, swinging the bar 448 rearwardly about its connection with the arm 342, the balls 452 and 444 sliding along the pins 454 and 442. By reason of the relative inclinations of the pins 442 and 454 the result is that substantially no movement is imparted at this time to the lever 436 by the bar 448. When, however, the opposite side grippers are caused to move respectively in opposite directions to adjust the upper on the last in response to movement of the hand lever 424, the two rock shafts 184, 324 are rocked respectively in opposite directions by reason of their connections to the grippers, so that one of the arms 340, 342 is swung in a clockwise direction (Fig. 4) and the other arm in a counterclockwise direction. Accordingly the movement of the bar 448 by the arm 340 and the link 460 does not compensate for the upward or downward movement of the left-hand end of the bar by the arm 342, as when both side grippers are moving simultaneously in the same direction, but has the opposite effect, so that the right-hand end of the bar 448 is swung either upward or downward to operate the lever 436 and thereby to impart swinging movement to the upper end of the valve-controlling lever 228. It will be understood that this movement of the upper end of the lever 228 is in the same direction as that in which its lower end is swung by the movement of the hand lever 424 and tends progressively to counteract the effect of the movement of the hand lever or, in other words, tends to restore the valves 54, 56 to their initial or neutral positions. The valves, however, are not actually restored to their initial positions, to cause the side grippers to come to a stop, until just after the movement of the hand lever ceases, by reason of the slight time-lag in the operating connections. Immediately after the hand lever is brought to a stop the side grippers come to a stop in the positions which they have assumed by reason of the movement of the hand lever. It will, therefore, be evident that the opposite side grippers are controlled by the hand lever 424, with respect to their relative movements heightwise of the last, in substantially as direct a manner as if they were actually connected to the hand lever.

Means is provided for returning the mechanism operated by the hand lever 424 to its normal position, with the hand lever in a central upright position, prior to the end of the second stage of the cycle of operations of the machine, so that the side grippers will be returned by the fluid-pressure means into their initial relation to each other before they operate on the next shoe. For this purpose there is mounted on the cam shaft 148 a cam 400 (Figs. 2 and 4) in engagement with a roll 464 on the lower arm of a lever 466 pivotally mounted on the shaft 142, the upper arm 468 of the lever being bifurcated and provided with faces 470 (Fig. 13) diverging forwardly from a central slot 472. The faces 470 are arranged to cooperate with faces 474 formed on a member 482 which is secured to the rock shaft 241, so that as the arm 468 is swung in a forward direction one or the other of the faces 470 engages the corresponding face 474 to turn the shaft 241 to its initial position. When the parts are in their normal relation a portion of the member 482 fits in the slot 472 in the arm 468, as illustrated in Fig. 13. The contour of the cam 400 is such that the arm 468 is swung rearwardly, by a spring 476 (Fig. 4) connected to the lever 466 and to the rod 152, to release the shaft 241 by the time the grippers have completed their upper-pulling movement, so that the operator may thereafter move the hand lever 424 as may be necessary to cause the upper to be adjusted properly on the last.

While the machine is at rest between the two stages of the operating cycle the operator may swing one or both of the side grippers lengthwise of the last to straighten the tip line of the upper, if such an operation is required, by the use of manual means not herein shown but with which machines of the illustrated type are commonly equipped. The operator may also at this time, by use of the treadle 420, cause all the grippers to be returned completely to their starting positions and opened to release the upper, in case conditions are such that it is desirable to rearrange the margin of the upper between the gripper jaws and to pull the upper again. To do this it is only necessary to depress the treadle beyond the position determined by engagement of the spring-controlled plunger 422 with the floor, compressing the spring which backs up this plunger. After arranging the upper once more between the gripper jaws the operator releases the treadle 420, whereupon the grippers are again closed automatically and operated to pull the upper by their fluid-operated mechanisms by reason of the return of the cam lever 140 and the arm 416 controlling the link 248.

In the operation of the machine, after a shoe has been properly positioned on the shoe rest 2 and the margin of the upper materials positioned between the open jaws of the several grippers, the operator depresses the starting treadle 149 to trip the clutch and thus cause the cam shaft 148 to begin to rotate. The rotation of the cams 146, 254 on this shaft, which respectively control the fluid-pressure mechanisms associated with the toe gripper and the side grippers, immediately causes oil to be admitted above the pistons which operate these grippers to close their jaws on the upper. At this time the roll 406 (Fig. 1) is engaged by such a portion of the cam 404 that the reducing valve 284 is held down to cause oil under the same high pressure as that in the accumulator 22 to be supplied to the pistons connected to the side grippers and thus to insure a quick closing of the side gripper jaws. The contours of the cams 146, 254 are such that after the gripper jaws have been closed the toe gripper is moved downwardly to apply a pull to the upper before the upper is pulled by the side grippers and is then moved upwardly to relax the force of its pull on the upper as the side grippers are about to pull the upper. Thereafter all the grippers move downwardly together to subject the upper to tension. Before the side grippers begin their upper-pulling movement the cam 404 is turned far enough to release the pressure-reducing valve 284 to the normal action of the spring 288, so that oil under a reduced pressure is supplied to the pistons which operate the side grippers. By reason of the tendency for the valves controlling the flow of oil to the several pistons to close in response to the movements of the gripper-operating mechanisms, while the levers operated by the cams are moving progressively in the directions to open them, as hereinbefore described, the grippers are not permitted to act in such an unrestrained manner as they would if the valves were suddenly moved to fully open positions and permitted to remain thus open during the entire movements of the grippers but, on the contrary, move at a speed dependent upon that of the cam-operated levers. The grippers accordingly apply a gradual pull to the upper without any danger of damaging the upper materials. When the resistance of the upper to the force of the pull becomes sufficient to cause the grippers substantially to cease their upper-pulling movements, the cam-operated levers are still moved somewhat farther to cause a wider opening of the valves and thus insure that the grippers will be subjected to the full force of the operating fluid. Thereafter the cam shaft 148 comes to a stop at the end of the first stage of the operating cycle of the machine by reason of the opening of the clutch.

The operator then inspects the results of the upper-pulling action of the grippers, and if he thinks it desirable may, as heretofore, alter the force of the pull of the toe gripper on the upper by movement of the hand lever 176 and may also adjust the side grippers lengthwise of the last to straighten the tip line in the manner hereinbefore explained. If the operator thinks it desirable that the side grippers should exert more force on the upper, he may readily bring this about with but little effort on his part by merely swinging the hand lever 384 in a rearward direction and thus causing the pressure-reducing valve 284 to supply oil under greater pressure to the pistons which operate the side grippers. As also hereinbefore described, the operator may, if he sees that the throat of the upper is not lying centrally of the last, first partially depress the treadle 420 to cause the grippers to relax the force of their pull on the upper and then move the hand lever 424 in the proper direction to cause one side gripper to move farther downwardly and the other to move upwardly, thereafter releasing the treadle 420 to cause the grippers again to pull the upper with the same force as before. In case conditions are such as to require the upper to be rearranged in the grippers and pulled a second time, the operator depresses the treadle 420 fully to cause the grippers to return to their initial positions and release the upper, rearranges the margin of the upper between the gripper jaws, and then releases the treadle to cause the grippers again to close and pull the upper.

After having assured himself that the upper has been properly tensioned by the grippers and is correctly positioned on the last, the operator depresses the starting treadle 149 a second time to cause the machine to perform the second and final stage of the cycle of operations. After the machine has thus been started, the usual side clamp arms are swung inwardly to clamp and hold the shoe and the tacker arms are swung inwardly beneath the shoe into positions to drive the tacks, the several grippers being automatically opened to release the upper early in the inward movements of the tacker arms. Immediately after the grippers release the upper the pressure of the oil supplied to the pistons which operate the side grippers is increased by the action of the cam 404 on the reducing valve 284 to cause these grippers to move quickly downward out of the way of the tackers. After the driving of the tacks the parts are returned to their starting positions, the grippers being returned upwardly to their initial positions by their operating pistons in response to the automatic control of the valves associated therewith and the valves finally assuming their neutral or closed positions after the movements of the cam-operated levers 140, 250 have ceased.

Having described the invention, what we claim as new and desire to secure by Letters Patent of the United States is:

1. In a machine for shaping uppers over lasts, upper-gripping means for gripping the margin of an upper on a last, fluid-operated means for operating said upper-gripping means first to grip the upper and then to pull the upper and for thereafter returning said upper-gripping means to starting position by pressure of the operating fluid on said fluid-operated means, and mechanism for controlling the flow of the operating fluid to and from said fluid-operated means.

2. In a machine for shaping uppers over lasts, upper-gripping means for gripping the margin of an upper on a last, fluid-operated means for operating said upper-gripping means first to grip the upper and then to pull the upper and for thereafter returning said upper-gripping means to starting position by pressure of the operating fluid on said fluid-operated means, valve mechanism for controlling the flow of the operating fluid to and from said fluid-operated means, and power-operated means for automatically controlling said valve mechanism to cause the upper-gripping means to grip and pull the upper and to return to starting position at predetermined times in a cycle of operations of the machine.

3. In a machine for shaping uppers over lasts, upper-gripping means for gripping the margin of an upper on a last, fluid-operated means for effecting relative movement of said upper-gripping means and the last to pull the upper and for thereafter effecting reverse relative movement thereof by pressure of the operating fluid on said fluid-operated means, and power-operated means for automatically controlling the flow of the operating fluid to and from said fluid-operated means to cause said relative movements to take place at predetermined times in a cycle of operations of the machine.

4. In a machine for shaping uppers over lasts, a gripper for gripping the margin of an upper on a last, fluid-operated means for moving said gripper to pull the upper initially and for thereafter imparting reverse movement to the gripper by pressure of the operating fluid on said means, and mechanism for controlling the flow of the operating fluid to and from said fluid-operated means.

5. In a machine for shaping uppers over lasts, a gripper for gripping the margin of an upper on a last, fluid-operated means for moving said gripper to pull the upper and for thereafter returning the gripper to starting position by pressure of the operating fluid on said means, and power-operated means for automatically controlling the flow of the operating fluid to and from said fluid-operated means to cause the gripper to pull the upper and to return to its starting position at predetermined times in a cycle of operations of the machine.

6. In a machine for shaping uppers over lasts, a gripper for gripping the margin of an upper on a last, fluid-operated means comprising a cylinder and a piston therein for moving said gripper to pull the upper and for thereafter returning the gripper to starting position by pressure of the operating fluid acting respectively in the opposite ends of said cylinder, valve mechanism for controlling the flow of the operating fluid to and from the opposite ends of said cylinder, and power-operated means for automatically controlling said valve mechanism to cause the gripper to pull the upper and to return to its starting position at predetermined times in a cycle of operations of the machine.

7. In a machine for shaping uppers over lasts, a gripper for gripping the margin of an upper on a last, fluid-operated means for moving said gripper to pull the upper and for thereafter returning the gripper to starting position by pressure of the operating fluid on said means, valve mechanism for controlling the flow of the operating fluid to and from said fluid-operated means, a power-driven shaft rotatable in a cycle of operations of the machine, and means for controlling said valve mechanism by the rotation of said shaft to cause the gripper to pull the upper and to return to its starting position at predetermined times in the cycle.

8. In a machine for shaping uppers over lasts, a toe gripper and side grippers for gripping the margin of an upper respectively at the toe end and the opposite sides of a last, fluid-operated means for effecting relative movement of said grippers and the last to pull the upper and for thereafter effecting reverse relative movement thereof by pressure of the operating fluid on said fluid-operated means, and means for controlling the flow of the operating fluid to and from said fluid-operated means.

9. In a machine for shaping uppers over lasts, a toe gripper and side grippers for gripping the margin of an upper respectively at the toe end and the opposite sides of a last, fluid-operated means for operating said toe gripper and side grippers to pull the upper and for thereafter returning them to starting positions by pressure of the operating fluid on said means, and valve means for controlling the flow of the operating fluid to and from said fluid-operated means.

10. In a machine for shaping uppers over lasts, a toe gripper and side grippers for gripping the margin of an upper respectively at the toe end and the opposite sides of a last, fluid-operated devices associated respectively with said different grippers and comprising cylinders and pistons therein for moving said grippers to pull the upper and for thereafter returning them to starting positions by pressure of the operating fluid acting respectively in the opposite ends of said cylinders, and valve mechanisms associated respectively with said different devices for controlling the flow of the operating fluid to and from the opposite ends of said cylinders.

11. In a machine for shaping uppers over lasts, a toe gripper and side grippers for gripping the margin of an upper respectively at the toe end and the opposite sides of a last, fluid-operated devices associated respectively with said different grippers for moving them to pull the upper and for thereafter returning them to starting positions by pressure of the operating fluid on said devices, valve means for controlling the flow of the operating fluid to and from said devices, and power-operated means for automatically controlling said valve means to cause the grippers to pull the upper and to return to starting positions at predetermined times in a cycle of operations of the machine.

12. In a machine for shaping uppers over lasts, a toe gripper and side grippers for gripping the margine of an upper respectively at the toe end and the opposite sides of a last, fluid-operated devices associated respectively with said different grippers and comprising cylinders and pistons therein for moving said grippers to pull the upper and for thereafter returning them to starting positions by pressure of the operating fluid acting respectively in the opposite ends of said cylinders, valve mechanisms associated respectively with said different devices for controlling the flow of the operating fluid to and from the opposite ends of said cylinders, and power-operated means for automatically controlling said valve mechanisms to cause the grippers to pull the upper and to return to starting positions at predetermined times in a cycle of operations of the machine.

13. In a machine for shaping uppers over lasts, a toe gripper and side grippers for gripping the margin of an upper respectively at the toe end and the opposite sides of a last, fluid-operated devices associated respectively with said different grippers for moving them to pull the upper and for thereafter returning them to starting positions by pressure of the operating fluid on said devices, valve mechanisms associated respectively with said different devices for controlling the flow of the operating fluid to and from the devices, a power-operated cam for controlling the valve mechanism associated with the device for operating the toe gripper, and another power-operated cam for controlling the valve mechanisms associated with the devices for operating the side grippers.

14. In a machine for shaping uppers over lasts, a toe gripper and side grippers for gripping the margin of an upper respectively at the toe end and the opposite sides of a last, fluid-operated devices associated respectively with said different grippers for moving them to pull the upper and for thereafter returning them to starting positions by pressure of the operating fluid on said devices, valve mechanisms associated respectively with said different devices for controlling the flow of the operating fluid to and from the devices, a power-driven shaft rotatable in a cycle of operations of the machine, and a pair of cams on said shaft arranged respectively to control the valve mechanism associated with the device for operating the toe gripper and the valve mechanisms associated with the devices for operating the side grippers.

15. In a machine for shaping uppers over lasts, a gripper for gripping the margin of an upper on a last, fluid-operated means for effecting relative movement of said gripper and the last to cause the gripper to pull the upper, mechanism movable to admit operating fluid to said fluid-operated means and further movable thereafter with a tendency to increase the flow of the fluid thereto, and mechanism movable by said fluid-operated means for rendering said first-named mechanism in its movement substantially ineffective thus to increase the flow of the fluid and for thereby controlling the speed of the relative movement of the gripper and the last.

16. In a machine for shaping uppers over lasts, a gripper for gripping the margin of an upper on a last, fluid-operated means for effecting relative movement of said gripper and the last to cause the gripper to pull the upper, a valve for admitting operating fluid to said fluid-operated means when in open position, mechanism movable to open said valve and tending by continued movement further to open it, and mechanism movable progressively by said fluid-operated means to counteract the tendency of said first-named mechanism further to open the valve and thereby to control the speed of the relative movement of the gripper and the last.

17. In a machine for shaping uppers over lasts, a gripper for gripping the margin of an upper on a last, fluid-operated means for effecting relative movement of said gripper and the last to cause the gripper to pull the upper, a valve for admitting operating fluid to said fluid-operated means when in open position, mechanism movable to open said valve and tending by continued movement further to open it, and mechanism movable as determined by the relative movement of the gripper and the last for substantially preventing such further opening of the valve until said relative movement is retarded by resistance of the upper to the force of the pull applied thereto.

18. In a machine for shaping uppers over lasts, a gripper for gripping the margin of an upper on a last, fluid-operated means for effecting relative movement of said gripper and the last to cause the gripper to pull the upper, power-operated mechanism movable when started to admit operating fluid to said fluid-operated means and further movable with a tendency to increase the flow of the fluid thereto, and mechanism movable progressively by said fluid-operated means for rendering said first-named mechanism in its further movement substantially ineffective thus to increase the flow of the fluid and for thereby controlling the speed of the relative movement of the gripper and the last.

19. In a machine for shaping uppers over lasts, a gripper for gripping the margin of an upper on a last, fluid-operated means for effecting relative movement of said gripper and the last to cause the gripper to pull the upper, a valve for admitting operating fluid to said fluid-operated means when in open position, power-operated mechanism movable when started to open the valve and tending by continued movement further to open it, and mechanism movable progressively by said fluid-operated means and tending by its movement to close the valve as said power-operated mechanism thus tends further to open it.

20. In a machine for shaping uppers over lasts, a gripper for gripping the margin of an upper on a last, fluid-operated means for effecting relative movement of said gripper and the last to cause the gripper to pull the upper, a valve for admitting operating fluid to said fluid-operated means, power-operated mechanism arranged to move said valve automatically in one direction thus to admit the fluid and tending thereafter further to move it in the same direction to increase the flow of the fluid, and mechanism movable as determined by the relative movement of the gripper and the last and tending to move said valve in the opposite direction to prevent such increase in the flow of the fluid.

21. In a machine for shaping uppers over lasts, a gripper for gripping the margin of an upper on a last, fluid-operated means for moving said gripper to pull the upper, mechanism movable to admit operating fluid to said fluid-operated means and further movable with a tendency to increase the flow of the fluid thereto, and mechanism movable as determined by the movement of the gripper for rendering said first-named mechanism in its further movement substantially ineffective thus to increase the flow of the fluid and for thereby controlling the speed of the movement of the gripper.

22. In a machine for shaping uppers over lasts, a gripper for gripping the margin of an upper on a last, fluid-operated means for moving said gripper to pull the upper, a valve for admitting operating fluid to said fluid-operated means when in open position, mechanism movable to open said valve and tending by continued movement further to open it, and mechanism movable progressively as determined by the movement of the gripper for substantially preventing such further opening of the valve until the movement of the gripper is retarded by resistance of the upper to the force of the pull applied thereto.

23. In a machine for shaping uppers over lasts, a gripper for gripping the margin of an upper on a last, fluid-operated means for moving said gripper to pull the upper, a valve for admitting operating fluid to said fluid-operated means when in open position, power-operated mechanism movable automatically to open the valve and progressively movable thereafter with a tendency further to open it, and mechanism movable progressively as determined by the movement of the gripper for substantially preventing such further opening of the valve until the movement of the gripper is retarded by resistance of the upper to the force of the pull applied thereto.

24. In a machine for shaping uppers over lasts, a gripper for gripping the margin of an upper on a last, fluid-operated means for moving said gripper to pull the upper, a valve for admitting operating fluid to said fluid-operated means when in open position, power-operated mechanism including a cam-controlled lever movable automatically to open the valve and progressively movable thereafter with a tendency further to open it, and connections between said mechanism and the gripper for operating said mechanism as determined by the movement of the gripper to prevent substantially further opening of the valve and thus to control the speed of the movement of the gripper.

25. In a machine for shaping uppers over lasts, a toe gripper and side grippers for gripping the margin of an upper respectively at the toe end and the opposite sides of a last, fluid-operated devices associated respectively with said different grippers for moving them to pull the upper, means movable to admit operating fluid to said devices and further movable thereafter with a tendency to increase the flow of the fluid thereto, and mechanisms movable respectively as determined by the movements of the toe gripper and the side grippers for substantially preventing such increase in the flow of fluid to said devices and for thus controlling the speed of the movements of the grippers.

26. In a machine for shaping uppers over lasts, a toe gripper and side grippers for gripping the margin of an upper respectively at the toe end and the opposite sides of a last, fluid-operated devices associated respectively with said different grippers for moving them to pull the upper, valves arranged respectively to admit operating fluid to said different devices when in open positions, means movable to open said valves and tending by continued movement further to open them, and mechanisms movable respectively as determined by the movements of the toe gripper and the side grippers for substantially preventing such further opening of the valves until the movements of the grippers associated therewith are retarded by resistance of the upper to the force of the pull applied thereto.

27. In a machine for shaping uppers over lasts, a toe gripper and side grippers for gripping the margin of an upper respectively at the toe end and the opposite sides of a last, fluid-operated devices associated respectively with said different grippers for moving them to pull the upper, valves for admitting operating fluid respectively to said different devices, power-operated means for moving said valves automatically thus to admit the fluid and tending thereafter further to move them to increase the flow of the fluid, and mechanisms movable respectively as determined by the movements of the toe gripper and the side grippers and tending to move said valves reversely and thus to prevent such increase in the flow of the fluid.

28. In a machine for shaping uppers over lasts, a toe gripper and side grippers for gripping the margin of an upper respectively at the toe end and the opposite sides of a last, fluid-operated devices associated respectively with said different grippers for moving them to pull the upper, valves arranged respectively to admit operating fluid to said different devices when in open positions, power-operated mechanism comprising a member movable to open the toe gripper valve and progressively movable thereafter with a tendency further to open it, other power-operated mechanism comprising a member movable to open both side gripper valves and progressively movable thereafter with a tendency further to open them, and mechanisms movable respectively as determined by the movements of the toe gripper and the side grippers for controlling said power-operated mechanisms to prevent substantially such further opening of the valves until the movements of the grippers associated therewith are retarded by resistance of the upper to the force of the pull applied thereto.

29. In a machine for shaping uppers over lasts, grippers for gripping the margin of an upper respectively at the opposite sides of a last, fluid-operated devices associated respectively with said different grippers for moving them to pull the upper, valves arranged respectively to admit operating fluid to said different devices when in open positions, mechanism comprising a member common to said valves and movable to open them, said member tending thereafter by continued movement further to open them, and mechanism movable as determined by the movements of both grippers for substantially preventing such further opening of the valves by said member until the movements of the grippers are retarded by resistance of the upper to the force of the pull applied thereto.

30. In a machine for shaping uppers over lasts, grippers for gripping the margin of an upper respectively at the opposite sides of a last, fluid-operated devices associated respectively with said different grippers for moving them to pull the upper, valves arranged respectively to admit operating fluid to said different devices when in open positions, power-operated mechanism comprising a member common to said valves and movable automatically to open them, said member being thereafter progressively movable with a tendency further to open them, and connections between said power-operated mechanism and both grippers for rendering said member in its movement substantially ineffective further to open the valves until the movements of the grippers are retarded by resistance of the upper to the force of the pull applied thereto.

31. In a machine for shaping uppers over lasts, a toe gripper and side grippers for gripping the margin of an upper respectively at the toe end and the opposite sides of a last, fluid-operated means for operating said grippers to pull the upper, and power-operated means for automatically controlling the flow of operating fluid to and from said fluid-operated means to cause the toe gripper to applying a pull to the upper and then to relax the force of its pull before the side grippers pull the upper.

32. In a machine for shaping uppers over lasts, a toe gripper and side grippers for gripping the margin of an upper respectively at the toe end and the opposite sides of a last, fluid-operated devices associated respectively with the toe gripper and the side grippers for operating them to pull the upper, valve mechanisms associated respectively with said different devices for controlling the flow of operating fluid to and from the devices, and power-operated means for automatically operating said valve mechanisms in such time relation as to cause the toe gripper to apply a pull to the upper before the side grippers, then to relax the force of its pull, and thereafter to pull the upper again in company with the side grippers.

33. In a machine for shaping uppers over lasts, a toe gripper and side grippers for gripping the margin of an upper respectively at the toe end and the opposite sides of a last, fluid-operated devices associated respectively with the toe gripper and the side grippers for operating them to pull the upper, valve mechanisms associated respectively with said different devices for controlling the flow of operating fluid to and from the devices, and power-operated means comprising cams for controlling said valve mechanisms, said cams being so formed as to cause the toe gripper to apply a pull to the upper before the side grippers, then to relax the force of its pull, and thereafter to pull the upper again in company with the side grippers.

34. In a machine for shaping uppers over lasts, a gripper for gripping the margin of an upper on a last, fluid-operated means for moving said gripper to pull the upper, and a spring for yieldingly resisting variably as determined by the operator the movement of the gripper effected by said fluid-operated means.

35. In a machine for shaping uppers over lasts, a toe gripper and side grippers for gripping the margin of an upper respectively at the toe end and the opposite sides of a last, fluid-operated means for moving said grippers to pull the upper, and a spring for yieldingly resisting variably as determined by the operator the upper-pulling movement of the toe gripper independently of the movements of the side grippers.

36. In a machine for shaping uppers over lasts, a plurality of grippers for gripping the margin of an upper on a last, fluid-operated means for operating said grippers to pull the upper, and means for supplying operating fluid under different pressures for operating different grippers respectively.

37. In a machine for shaping uppers over lasts, a plurality of grippers for gripping the margin of an upper on a last, fluid-operated means for operating said grippers to pull the upper, means for supplying operating fluid under different pressures for operating different grippers respectively, and means for relatively varying said different pressures.

38. In a machine for shaping uppers over lasts, a plurality of grippers for gripping the margin of an upper on a last, fluid-operated devices associated respectively with said different grippers for operating them to pull the upper, a source of supply of operating fluid under pressure, means for admitting operating fluid from said source of supply to said different devices, and a pressure-reducing device for variably reducing the pressure of the fluid admitted to one of said devices while fluid under the same pressure as at said source of supply is admitted to another of the devices.

39. In a machine for shaping uppers over lasts, a plurality of grippers for gripping the margin of an upper on a last, fluid-operated devices associated respectively with said different grippers for operating them to pull the upper, a source of supply of operating fluid under pressure, means for conducting operating fluid from said source of supply to said different devices, and a pressure-reducing valve controlled by the pressure of the fluid acting on one of said devices for interrupting the supply of fluid to that device independently of the supply to another of the devices when that pressure reaches a predetermined maximum below the pressure at said source.

40. In a machine for shaping uppers over lasts, a plurality of grippers for gripping the margin of an upper on a last, fluid-operated devices associated respectively with said different grippers for operating them to pull the upper, a source of supply of operating fluid under pressure, means for conducting operating fluid from said source of supply to said different devices, a pressure-reducing valve arranged to be closed by the pressure of the fluid acting on one of said devices to interrupt the supply of fluid to that device independently of the supply to another of the devices when that pressure reaches a predetermined maximum below the pressure at said source, a spring against the resistance of which the valve is thus closed, and means for varying the stress of said spring to vary the amount of pressure required to close the valve.

41. In a machine for shaping uppers over lasts, a toe gripper and side grippers for gripping the margin of an upper respectively at the toe end and the opposite sides of a last, fluid-operated means for operating said grippers to pull the upper, and means for supplying operating fluid under different pressure to operate the side grippers than the fluid supplied to operate the toe gripper.

42. In a machine for shaping uppers over lasts, a toe gripper and side grippers for gripping the margin of an upper respectively at the toe end and the opposite sides of a last, fluid-operated means for operating the toe gripper and the side grippers respectively to pull the upper, and means for supplying operating fluid under less pressure to the side-gripper-operating means than to the toe-gripper-operating means.

43. In a machine for shaping uppers over lasts, a toe gripper and side grippers for gripping the margin of an upper respectively at the toe end and the opposite sides of a last, fluid-operated means for operating the toe gripper and the side grippers respectively to pull the upper, means for supplying operating fluid under different pressures respectively to said toe-gripper-operating means and side-gripper-operating means, and means for relatively varying said pressures.

44. In a machine for shaping uppers over lasts, a toe gripper and side grippers for gripping the margin of an upper respectively at the toe end and the opposite sides of a last, fluid-operated means for operating the toe gripper and the side grippers respectively to pull the upper, means for supplying operating fluid under pressure to the toe-gripper-operating means and the side-gripper-operating means, and means for varying the pressure of the fluid supplied to the side-gripper-operating means independently of that supplied to the toe-gripper-operating means.

45. In a machine for shaping uppers over lasts, a toe gripper and side grippers for gripping the margin of an upper respectively at the toe end and the opposite sides of a last, fluid-operated means for operating the toe gripper and the side grippers respectively to pull the upper, a source of supply of operating fluid under pressure, means for conducting operating fluid from said source of supply to the toe-gripper-operating means and the side-gripper-operating means, and a pressure-reducing device for variably reducing the pressure of the fluid supplied to the side-gripper-operating means while fluid of the same pressure as at said source is supplied to the toe-gripper-operating means.

46. In a machine for shaping uppers over lasts, a toe gripper and side grippers for gripping the margin of an upper respectively at the toe end and the opposite sides of a last, fluid-operated means for operating the toe gripper and the side grippers respectively to pull the upper, a source of supply of operating fluid under pressure, means for conducting operating fluid from said source of supply to the toe-gripper-operating means and the side-gripper-operating means, a pressure-reducing valve for reducing the pressure of the fluid supplied to the side-gripper-operating means independently of that supplied to the toe-gripper-operating means, and a spring controlling said valve and adjustable to vary the degree of such reduction of pressure.

47. In a machine for shaping uppers over lasts, a toe gripper and side grippers for gripping the margin of an upper respectively at the toe end and the opposite sides of a last, fluid-operated means for operating the toe gripper and the side grippers respectively to pull the upper, a source of supply of operating fluid under pressure, means for conducting operating fluid from said source of supply to the toe-gripper-operating means and the side-gripper-operating means, a pressure-reducing valve arranged to be closed by the pressure of the fluid acting on the side-gripper-operating means to interrupt the supply of fluid thereto independently of the supply to the toe-gripper-operating means when that pressure reaches a predetermined maximum below the pressure at said source, and means for opposing variable resistance to such closing of the valve to vary the amount of pressure required to close the valve.

48. In a machine for shaping uppers over lasts, a toe gripper and side grippers for gripping the margin of an upper respectively at the toe end and the opposite sides of a last, fluid-operated devices associated respectively with said different grippers for operating them to pull the upper and each comprising a cylinder and a piston therein, and means for supplying operating fluid under a variably determined lesser degree of pressure to the side-gripper-operating devices than to the toe-gripper-operating device, the piston and cylinder of each of the side-gripper-operating devices being of a greater diameter than the piston and cylinder of the toe-gripper-operating device.

49. In a machine for shaping uppers over lasts, a toe gripper and side grippers for gripping the margin of an upper respectively at the toe end and the opposite sides of a last, and fluid-operated devices associated respectively with said different grippers for operating them to pull the upper and each comprising a cylinder and a piston therein, the piston and cylinder of the toe-gripper-operating device being of a different diameter than the pistons and cylinders of the side-gripper-operating devices.

50. In a machine for shaping uppers over lasts, upper-gripping means for gripping the margin of an upper on a last, fluid-operated means for effecting relative movement of said upper-gripping means and the last to cause the upper-gripping means to pull the upper, and mechanism movable by the operator while the upper is held under tension by said fluid-operated means to vary the pressure of the operating fluid acting on said means and thus to vary the force of the pull on the upper.

51. In a machine for shaping uppers over lasts, upper-gripping means for gripping the margin of an upper on a last, fluid-operated means for effecting relative movement of said upper-gripping means and the last to cause the upper-gripping means to pull the upper, power-operated mechanism for automatically admitting operating fluid under predetermined pressure to said fluid-operated means, and mechanism movable by the operator while the upper is held under tension by said fluid-operated means to vary the pressure of the fluid acting on said means and thus to vary the force of the pull on the upper.

52. In a machine for shaping uppers over lasts, upper-gripping means for gripping the margin of an upper on a last, fluid-operated means for effecting relative movement of said upper-gripping means and the last to cause the upper-gripping means to pull the upper, valve mechanism for admitting operating fluid under pressure to said fluid-operated means, and mechanism movable by the operator while the upper is held under tension by said fluid-operated means to vary independently of said valve mechanism the pressure of the operating fluid acting on said means and thus to vary the force of the pull on the upper.

53. In a machine for shaping uppers over lasts, upper-gripping means for gripping the margin of an upper on a last, fluid-operated means for effecting relative movement of said upper-gripping means and the last to cause the upper-gripping means to pull the upper, a source of supply of operating fluid under pressure, means for conducting operating fluid from said source of supply to said fluid-operated means, a pressure-reducing device for reducing the pressure of the fluid acting on the fluid-operated means below the pressure at said source of supply, and mechanism movable by the operator while the upper is held under tension by said fluid-operated means to increase the pressure of the fluid acting on said means by control of said pressure-reducing device.

54. In a machine for shaping uppers over lasts, upper-gripping means for gripping the margin of an upper on a last, fluid-operated means for effecting relative movement of said upper-gripping means and the last to cause the upper-gripping means to pull the upper, a source of supply of operating fluid under pressure, means for conducting operating fluid from said source of supply to said fluid-operated means, a pressure-reducing valve arranged to be closed by the pressure of the fluid acting on said fluid-operated means to interrupt the supply of fluid thereto when that pressure reaches a predetermined maximum below the pressure at said source, a spring against the resistance of which the valve is thus closed, and mechanism movable by the operator while the upper is held under tension by said fluid-operated means to increase the resistance to the closing of the valve and thus to increase the pressure of the fluid acting on said means.

55. In a machine for shaping uppers over lasts, a toe gripper and side grippers for gripping the margin of an upper respectively at the toe end and the opposite sides of a last, fluid-operated means for operating the toe gripper and the side grippers respectively to pull the upper, and mechanism movable by the operator while the upper is held under tension by said fluid-operated means to vary relatively the pressure of the operating fluid acting on the toe-gripper-operating means and the pressure of the fluid acting on the side-gripper-operating means.

56. In a machine for shaping uppers over lasts, a toe gripper and side grippers for gripping the margin of an upper respectively at the toe end and the opposite sides of a last, fluid-operated means for operating the toe gripper and the side grippers respectively to pull the upper, and mechanism movable by the operator while the upper is held under tension by said fluid-operated means to increase the pressure of the operating fluid acting on the side-gripper-operating means independently of the fluid acting on the toe-gripper-operating means.

57. In a machine for shaping uppers over lasts, a toe gripper and side grippers for gripping the margin of an upper respectively at the toe end and the opposite sides of a last, fluid-operated means for operating the toe gripper and the side grippers respectively to pull the upper, valves movable to admit operating fluid under pressure to said fluid-operated means, and mechanism movable by the operator while the upper is held under tension by said fluid-operated means to effect independently of said valves a relative variation in the pressure of the operating fluid acting on the toe-gripper-operating means and the pressure of the fluid acting on the side-gripper-operating means.

58. In a machine for shaping uppers over lasts, a toe gripper and side grippers for gripping the margin of an upper respectively at the toe end and the opposite sides of a last, fluid-operated means for operating the toe gripper and the side grippers respectively to pull the upper, a source of supply of operating fluid under pressure, valves for admitting fluid from said source of supply to said fluid-operated means, power-operated mechanism for automatically controlling said valves to admit the fluid, a pressure-reducing device for reducing the pressure of the fluid supplied to the side-gripper-operating means independently of that supplied to the toe-gripper-operating means, and mechanism movable by the operator while the upper is held under tension to increase the pressure of the fluid acting on the side-gripper-operating means by control of said pressure-reducing device.

59. In a machine for shaping uppers over lasts, a toe gripper and side grippers for gripping the margin of an upper respectively at the toe end and the opposite sides of a last, fluid-operated means for operating the toe gripper and the side grippers respectively to pull the upper, a source of supply of operating fluid under pressure, means for conducting operating fluid from said source of supply to the toe-gripper-operating means and the side-gripper-operating means, and a pressure-reducing device for reducing the pressure of the fluid supplied to the side-gripper-operating means independently of that supplied to the toe-gripper-operating means, said pressure-reducing device being movable under control of the operator while the upper is held under tension to increase the pressure of the fluid acting on the side-gripper-operating means and thus to increase the force of the pull of the side grippers on the upper.

60. In a machine for shaping uppers over lasts, a toe gripper and side grippers for gripping the margin of an upper respectively at the toe end and the opposite sides of a last, fluid-operated means for operating the toe gripper and the side grippers respectively to pull the upper, a source of supply of operating fluid under pressure, means for conducting operating fluid from said source of supply to the toe-gripper-operating means and the side-gripper-operating means, a pressure-reducing valve for controlling the pressure of the fluid supplied to the side-gripper-operating means independently of the fluid supplied to the toe-gripper-operating means, said valve being arranged to be closed by the pressure of the fluid acting on the side-gripper-operating means to interrupt the supply of fluid thereto when that pressure reaches a predetermined maximum below the pressure at said source, a spring against the resistance of which the valve is thus closed, and means movable by the operator while the upper is held under tension for yieldingly increasing the resistance to such closing of the valve and for thereby causing the valve to supply fluid under increased pressure to the side-gripper-operating means to increase the force of the pull of the side grippers on the upper.

61. In a machine for shaping uppers over lasts, upper-gripping means for gripping the margin of an upper on a last, fluid-operated means for imparting to said upper-gripping means movement to pull the upper and thereafter a further withdrawing movement upon release of the upper, means for admitting operating fluid under pressure to said fluid-operated means, and mechanism for increasing the pressure of the fluid admitted thereto after the pull on the upper to accelerate the withdrawing movement of the upper-gripping means.

62. In a machine for shaping uppers over lasts, upper-gripping means for gripping the margin of an upper on a last, fluid-operated means for imparting to said upper-gripping means movement to pull the upper and thereafter a further withdrawing movement upon release of the upper, a source of supply of operating fluid under pressure, means for conducting operating fluid from said source of supply to said fluid-operated means, a pressure-reducing device for reducing the pressure of the fluid conducted to said fluid-operated means below the pressure at said source, and mechanism for increasing the pressure of the fluid conducted to said fluid-operated means by control of said pressure-reducing device after the pull on the upper to accelerate the withdrawing movement of said upper-gripping means.

63. In a machine for shaping uppers over lasts, upper-gripping means for gripping the margin of an upper on a last, fluid-operated means for imparting to said upper-gripping means movement to pull the upper and thereafter a further withdrawing movement upon release of the upper, valve mechanism for admitting operating fluid under pressure to said fluid-operated means, power-operated means for automatically controlling said valve mechanism thus to admit the fluid, and automatic means for increasing independently of said valve mechanism the pressure of the fluid admitted to said fluid-operated means after the pull on the upper to accelerate the withdrawing movement of said upper-gripping means.

64. In a machine for shaping uppers over lasts, upper-gripping means for gripping the margin of an upper on a last, fluid-operated means for imparting to said upper-gripping means movement to pull the upper and thereafter a further withdrawing movement upon release of the upper, a source of supply of operating fluid under pressure, valve mechanism for admitting fluid from said source of supply to said fluid-operated means, a pressure-reducing device for reducing the pressure of the fluid admitted to said fluid-operated means below the pressure at said source in the pulling of the upper, and automatic means arranged to act on said pressure-reducing device to increase the pressure of the fluid thus admitted to said fluid-operated means after the pull on the upper to accelerate the withdrawing movement of said upper-gripping means.

65. In a machine for shaping uppers over lasts, upper-gripping means for gripping the margin of an upper on a last, fluid-operated means for imparting to said upper-gripping means movement to pull the upper and thereafter a further withdrawing movement upon release of the upper, means for admitting operating fluid under pressure to said fluid-operated means, a device for varying the pressure of the fluid thus admitted, and cam-controlled means for automatically operating said device to increase the pressure of the fluid admitted to said fluid-operated means after the pull on the upper to accelerate the withdrawing movement of the upper-gripping means.

66. In a machine for shaping uppers over lasts, upper-gripping means for gripping the margin of an upper on a last, fluid-operated means for imparting to said upper-gripping means movement to pull the upper and thereafter a further withdrawing movement upon release of the upper, a source of supply of operating fluid under pressure, means for conducting operating fluid from said source of supply to said fluid-operated means, a pressure-reducing valve for reducing the pressure of the fluid supplied to said fluid-operated means below the pressure at said source in the pulling of the upper, said valve being arranged to be closed by the pressure of the fluid acting on said fluid-operated means to interrupt the supply of fluid thereto when that pressure reaches a predetermined maximum below the pressure at said source, and automatic means for opening said valve after the pull on the upper to increase the pressure of the fluid supplied to said fluid-operated means and thus to accelerate the withdrawing movement of the upper-gripping means.

67. In a machine for shaping uppers over lasts, grippers for gripping the margin of an upper at the opposite sides of a last, fluid-operated means for imparting to said grippers movement heightwise of the last to pull the upper and thereafter further movement in the same direction upon their release of the upper, means for admitting operating fluid under pressure to said fluid-operated means, a device for varying the pressure of the fluid thus admitted, and means to cause said device to increase the pressure of the fluid admitted to said fluid-operated means after the pull on the upper to accelerate said further movement of the grippers.

68. In a machine for shaping uppers over lasts, grippers for gripping the margin of an upper at the opposite sides of a last, fluid-operated means for imparting to said grippers movement heightwise of the last to pull the upper and thereafter further movement in the same direction upon their release of the upper, a source of supply of operating fluid under pressure, means for conducting operating fluid from said source of supply to said fluid-operated means, a device for reducing the pressure of the fluid conducted to said fluid-operated means below the pressure at said source in operating the grippers to pull the upper, and automatic means to cause said device to increase the pressure of the fluid conducted to said fluid-operated means after the pull on the upper to accelerate said further movement of the grippers.

69. In a machine for shaping uppers over lasts, upper-gripping means for gripping the margin of an upper on a last, fluid-operated means for operating said upper-gripping means first to grip the upper and then to pull the upper, and means for supplying to said fluid-operated means fluid under comparatively high pressure to effect a quick gripping of the upper and fluid under reduced pressure thereafter to effect the pulling of the upper.

70. In a machine for shaping uppers over lasts, upper-gripping means for gripping the margin of an upper on a last, fluid-operated means for operating said upper-gripping means first to grip the upper and then to pull the upper, means for admitting operating fluid under pressure to said fluid-operated means, a device for varying the pressure of the fluid thus admitted, and automatic means for controlling said device to cause fluid under comparatively high pressure to act on said upper-gripping means in the gripping of the upper and fluid under reduced pressure to act thereafter in the pulling of the upper.

71. In a machine for shaping uppers over lasts, upper-gripping means for gripping the margin of an upper on a last, fluid-operated means for operating said upper-gripping means first to grip the upper and then to pull the upper, a source of supply of operating fluid under pressure, means for conducting operating fluid from said source of supply to said fluid-operated means, a pressure-reducing device for reducing the pressure of the fluid conducted to said fluid-operated means below the pressure at said source during the pulling of the upper, and automatic means for controlling said pressure-reducing device to increase the pressure of the fluid acting to effect the gripping of the upper.

72. In a machine for shaping uppers over lasts, upper-gripping means for gripping the margin of an upper on a last, fluid-operated means for operating said upper-gripping means first to grip and then to pull the upper and for thereafter imparting thereto a withdrawing movement upon release of the upper, and means for supplying to said fluid-operated means fluid under comparatively high pressure to effect a quick gripping of the upper, fluid under reduced pressure to effect the pulling of the upper, and fluid again under comparatively high pressure to impart to the upper-gripping means its withdrawing movement.

73. In a machine for shaping uppers over lasts, upper-gripping means for gripping the margin of an upper on a last, fluid-operated means for operating said upper-gripping means first to grip and then to pull the upper and for thereafter imparting thereto a withdrawing movement upon release of the upper, means for admitting operating fluid under pressure to said fluid-operated means, a device for varying the pressure of the fluid thus admitted, and automatic means for controlling said device to cause fluid under comparatively high pressure to act on said upper-gripping means in the gripping of the upper, fluid under reduced pressure to act thereafter in the pulling of the upper, and fluid again under comparatively high pressure to impart to the upper-gripping means its withdrawing movement.

74. In a machine for shaping uppers over lasts, upper-gripping means for gripping the margin of an upper on a last, fluid-operated means for operating said upper-gripping means first to grip and then to pull the upper and for thereafter imparting thereto a withdrawing movement upon release of the upper, a source of supply of operating fluid under pressure, means for conducting operating fluid from said source of supply to said fluid-operated means, a pressure-reducing valve for reducing pressure of the fluid supplied to said fluid-operated means below the pressure at said source in the pulling of the upper, said valve being arranged to be closed by the pressure of the fluid acting on said fluid-operated means to interrupt the supply of fluid thereto when that pressure reaches a predetermined maximum below the pressure at said source, and automatic means for opening said valve to supply fluid under increased pressure to said fluid-operated means in the gripping of the upper and again after the pulling of the upper to accelerate the withdrawing movement of the upper-gripping means.

75. In a machine for shaping uppers over lasts, grippers for gripping the margin of an upper respectively at the opposite sides of a last and for pulling the upper, fluid-operated devices connected respectively to said different grippers, means for controlling the flow of the operating fluid to and from said devices, a member movable by the operator, and mechanism for operating said controlling means by said member after the pulling of the upper to cause the grippers to be moved respectively in opposite directions by said devices to adjust the upper relatively to the last.

76. In a machine for shaping uppers over lasts, grippers for gripping the margin of an upper respectively at the opposite sides of a last and for pulling the upper, fluid-operated devices connected respectively to said different grippers, a controlling member movable in different directions by the operator, and means for controlling the flow of the operating fluid to said devices by movement of said member after the pulling of the upper to cause said grippers to adjust the upper relatively to the last in one direction or in the opposite direction depending upon the direction of movement of said member.

77. In a machine for shaping uppers over lasts, grippers for gripping the margin of an upper respectively at the opposite sides of a last and for pulling the upper, fluid-operated devices connected respectively to said different grippers, valve mechanisms associated respectively with said different devices for controlling the flow of the operating fluid to and from the devices, a controlling member movable in different directions by the operator, and means for operating said valve mechanisms by said member after the pulling of the upper to cause the upper to be shifted laterally of the last by the grippers in one direction or the other depending upon the direction of movement of said member.

78. In a machine for shaping uppers over lasts, grippers for gripping the margin of an upper respectively at the opposite sides of a last and for pulling the upper, fluid-operated devices associated respectively with said different grippers and comprising cylinders and pistons therein for moving said grippers in the direction of the pull on the upper and in the opposite direction by pressure of the operating fluid acting respectively in the opposite ends of said cylinders, valve means for controlling the flow of the operating fluid to and from the opposite ends of said cylinders, a member movable by the operator, and mechanism for operating said valve means by said member after the pulling of the upper to cause one of the grippers to be moved in the direction of the pull and the other in the opposite direction to shift the upper laterally of the last.

79. In a machine for shaping uppers over lasts, grippers for gripping the margin of an upper respectively at the opposite sides of a last and for pulling the upper, fluid-operated means connected to said grippers, means for controlling the flow of the operating fluid to and from said fluid-operated means, mechanism movable by the operator for operating said controlling means after the pulling of the upper to cause the grippers to adjust the upper relatively to the last, and additional mechanism movable as determined by the adjusting movements of the grippers for operating said controlling means to cause the grippers to come to a stop in positions determined variably by the extent of the movement of said first-named mechanism.

80. In a machine for shaping uppers over lasts, grippers for gripping the margin of an upper respectively at the opposite sides of a last and for pulling the upper, fluid-operated means connected to said grippers, means for controlling the flow of the operating fluid to and from said fluid-operated means, a member movable in different directions by the operator, mechanism for operating said controlling means by said member after the pulling of the upper to cause the grippers to adjust the upper relatively to the last in one direction or in the opposite direction depending upon the direction of movement of said member, and additional mechanism movable as determined by the adjusting movements of the grippers for operating said controlling means to cause the grippers to come to a stop in positions determined variably by the extent of the movement of said member.

81. In a machine for shaping uppers over lasts, grippers for gripping the margin of an upper respectively at the opposite sides of a last and for pulling the upper, fluid-operated devices connected respectively to said different grippers, means for controlling the flow of the operating fluid to and from said devices, a member movable by the operator, mechanism for operating said controlling means by said member after the pulling of the upper to cause the grippers to be moved respectively in opposite directions heightwise of the last to shift the upper laterally of the last, and additional mechanism movable as determined by the movements of the grippers for operating said controlling means to cause the grippers to come to a stop in positions determined variably by the extent of the movement of said member.

82. In a machine for shaping uppers over lasts, grippers for gripping the margin of an upper respectively at the opposite sides of a last and for pulling the upper, fluid-operated devices connected respectively to said different grippers, valve mechanisms associated respectively with said different devices for controlling the flow of the operating fluid to and from the devices, a controlling member movable by the operator, means for operating said valve mechanisms by said member after the pulling of the upper to cause the grippers to be moved respectively in opposite directions heightwise of the last to shift the upper laterally of the last, and additional means movable as determined by the movements of the grippers for controlling said valve mechanisms to cause the grippers to come to a stop in positions determined variably by the extent of the movement of said member.

83. In a machine for shaping uppers over lasts, grippers for gripping the margin of an upper on a last, fluid-operated means for operating said grippers to pull the upper, means for controlling the flow of the operating fluid to said fluid-operated means to cause the grippers to pull the upper, and additional means movable by the operator after the pulling of the upper for further controlling the flow of the operating fluid to cause said fluid-operated means to adjust the upper relatively to the last by relative movements of the grippers.

84. In a machine for shaping uppers over lasts, grippers for gripping the margin of an upper respectively at the opposite sides of a last, fluid-operated devices associated respectively with said different grippers for operating them to pull the upper, valve mechanisms associated respectively with said different devices for controlling the flow of the operating fluid to and from the devices, means for operating said valve mechanisms to cause the grippers to pull the upper, and additional means movable by the operator for operating said valve mechanisms after the pulling of the upper to cause said grippers to be moved respectively in opposite directions to adjust the upper laterally of the last.

85. In a machine for shaping uppers over lasts, grippers for gripping the margin of an upper respectively at the opposite sides of a last, fluid-operated devices associated respectively with said different grippers for operating them to pull the upper, valve mechanisms associated respectively with said different devices for controlling the flow of the operating fluid to and from the devices, power-operated means for automatically operating said valve mechanisms to cause the grippers to pull the upper, a member movable by the operator, and means for also operating said valve mechanisms by said member after the pulling of the upper to cause the grippers to be moved respectively in opposite directions to adjust the upper laterally of the last.

86. In a machine for shaping uppers over lasts, grippers for gripping the margin of an upper respectively at the opposite sides of a last, fluid-operated devices associated respectively with said different grippers for operating them to pull the upper, valve mechanisms associated respectively with said different devices for controlling the flow of the operating fluid to and from the devices, means for operating said valve mechanisms to cause the grippers to pull the upper, a member movable in different directions by the operator, and means for also operating said valve mechanisms by said member after the pulling of the upper to cause the upper to be adjusted laterally of the last by the grippers in one direction or the other depending upon the direction of the movement of said member.

87. In a machine for shaping uppers over lasts, grippers for gripping the margin of an upper respectively at the opposite sides of a last, fluid-operated means for operating said grippers to pull the upper, means for controlling the flow of the operating fluid to said fluid-operated means to cause the grippers to pull the upper, a member movable by the operator, means for further controlling the flow of the operating fluid by said member after the pulling of the upper to cause the grippers to adjust the upper relatively to the last a distance depending upon the extent of the movement of said member, and automatic means for returning said member to its initial position in the course of the further operation of the machine.

88. In a machine for shaping uppers over lasts, grippers for gripping the margin of an upper respectively at the opposite sides of a last, fluid-operated devices associated respectively with said different grippers for operating them to pull the upper, valve mechanisms associated respectively with said different devices for controlling the flow of the operating fluid to and from the devices, means for operating said valve mechanisms to cause the grippers to pull the upper, a member movable by the operator, means for also operating said valve mechanisms by said member after the pulling of the upper to cause the grippers to adjust the upper laterally of the last a distance depending upon the extent of the movement of said member, and automatic means for returning said member to its initial position in the course of the further operation of the machine.

89. In a machine for shaping uppers over lasts, grippers for gripping the margin of an upper respectively at the opposite sides of a last, fluid-operated devices associated respectively with said different grippers for operating them to pull the upper, valve mechanisms associated respectively with said different devices for controlling the flow of the operating fluid to and from the devices, means including a member bodily movable in one direction for operating said valve mechanisms to cause the grippers to pull the upper, said member being mounted also for swinging movement and having means for operating the valve mechanisms by that movement to cause the grippers to move respectively in opposite directions to adjust the upper laterally of the last, and means movable by the operator thus to swing said member after the pulling of the upper.

90. In a machine for shaping uppers over lasts, grippers for gripping the margin of an upper respectively at the opposite sides of a last, fluid-operated devices associated respectively with said different grippers for operating them to pull the upper, valve mechanisms associated respectively with said different devices for controlling the flow of the operating fluid to and from the devices, means including a member bodily movable in one direction for operating said valve mechanisms to cause the grippers to pull the upper, said member being mounted also for swinging movement and having means for operating the valve mechanisms by that movement to cause the grippers to move respectively in opposite directions to adjust the upper laterally of the last, means movable by the operator thus to swing said member after the pulling of the upper, and automatic means for swinging said member about a different axis to terminate the adjusting movements of the grippers by control of said valve mechanisms.

91. In a machine for shaping uppers over lasts, grippers for gripping the margin of an upper respectively at the opposite sides of a last, fluid-operated devices associated respectively with said different grippers for operating them to pull the upper, valve mechanisms associated respectively with said different devices for controlling the flow of the operating fluid to and from the devices, means including a member bodily movable in one direction for operating said valve mechanisms to cause the grippers to pull the upper, said member being mounted also for swinging movement and having means for operating the valve mechanisms by that movement to cause the grippers to move respectively in opposite directions to adjust the upper laterally of the last, means movable by the operator thus to swing said member after the pulling of the upper, and mechanism movable as determined by the adjusting movements of the grippers for swinging said member about a different axis to terminate automatically said movements of the grippers by control of said valve mechanisms.

92. In a machine for shaping uppers over lasts, grippers for gripping the margin of an upper respectively at the opposite sides of a last, fluid-operated devices associated respectively with said different grippers for operating them to pull the upper, valve mechanisms associated respectively with said different devices for controlling the flow of the operating fluid to and from the devices, means including a member bodily movable in one direction for operating said valve mechanisms to cause the grippers to pull the upper, said member being mounted also for swinging movement about an axis at one end thereof and having means for operating the valve mechanisms by that movement to cause the grippers to move respectively in opposite directions to adjust the upper laterally of the last, controlling means movable by the operator and connected to said member between its opposite ends for thus swinging it after the pulling of the upper, and mechanism movable as determined by the adjusting movements of the grippers for automatically swinging said member about its connection with said controlling means to terminate said movements of the grippers by control of said valve mechanisms.

93. In a machine for shaping uppers over lasts, upper-gripping means for gripping the margin of an upper on a last, fluid-operated means for operating said upper-gripping means to pull the upper, mechanism movable by the operator after the pull on the upper for controlling the flow of the operating fluid to cause said fluid-operated means to relax the force of the pull on the upper, and additional mechanism movable by the operator for further controlling the flow of the operating fluid to cause said upper-gripping means to adjust the upper relatively to the last after the force of the pull has thus been relaxed.

94. In a machine for shaping uppers over lasts, grippers for gripping the margin of an upper on a last, fluid-operated means for operating said grippers to pull the upper, mechanism movable by the operator after the pull on the upper for controlling the flow of the operating fluid to cause said fluid-operated means to relax the force of the pull on the upper, and additional mechanism movable by the operator for further controlling the flow of the operating fluid to cause said fluid-operated means to adjust the upper relatively to the last by relative movement of the grippers after the force of the pull has thus been relaxed.

95. In a machine for shaping uppers over lasts, grippers for gripping the margin of an upper on a last, fluid-operated means for operating said grippers to pull the upper, mechanism including a treadle movable by the operator after the pull on the upper for controlling the flow of the operating fluid to cause said fluid-operated means to relax the force of the pull on the upper, and additional mechanism including a hand lever movable by the operator for further controlling the flow of the operating fluid to cause said fluid-operated means to adjust the upper relatively to the last by relative movement of the grippers after the force of the pull has thus been relaxed.

96. In a machine for shaping uppers over lasts, grippers for gripping the margin of an upper respectively at the toe end and the opposite sides of a last, fluid-operated means for operating said grippers to pull the upper, mechanism movable by the operator after the pull on the upper for controlling the flow of the operating fluid to cause said fluid-operated means to relax the force of the pull of all said grippers on the upper, and additional mechanism movable by the operator for further controlling the flow of the operating fluid to cause said fluid-operated means to adjust the upper relatively to the last by movements of the side grippers only after the force of the pull has thus been relaxed.

97. In a machine for shaping uppers over lasts, grippers for gripping the margin of an upper respectively at the toe end and the opposite sides of a last, fluid-operated devices associated respectively with said different grippers for operating them to pull the upper, valve mechanisms associated respectively with said different devices for controlling the flow of the operating fluid to and from said devices, mechanism movable by the operator after the pull on the upper for controlling all said valve mechanisms to cause the grippers to relax the force of the pull on the upper, and additional mechanism movable by the operator for controlling the valve mechanisms associated with the side-gripper-operating devices to cause the side grippers to move respectively in opposite directions to adjust the upper laterally of the last after the force of the pull has thus been relaxed.

98. In a machine for shaping uppers over lasts, grippers for gripping the margin of an upper respectively at the opposite sides of a last, fluid-operated means for operating said grippers to pull the upper, valve means for controlling the flow of the operating fluid to and from said fluid-operated means, mechanism movable by the operator after the pull on the upper for controlling said valve means to cause the grippers to relax the force of the pull on the upper, and additional mechanism movable by the operator for further controlling said valve means to cause the grippers to adjust the upper laterally of the last by moving respectively in opposite directions after the force of the pull has thus been relaxed.

99. In a machine for shaping uppers over lasts, grippers for gripping the margin of an upper respectively at the opposite sides of a last, fluid-operated devices associated respectively with said different grippers for operating them to pull the upper, valves associated respectively with said different devices for controlling the flow of the operating fluid to and from said devices, mechanism movable by the operator after the pull on the upper for moving both said valves in directions to cause the grippers to relax the force of the pull on the upper, and additional mechanism for moving said valves in directions to cause the grippers to shift the upper laterally of the last by moving respectively in opposite directions after the force of the pull has thus been relaxed.

100. In a machine for shaping uppers over lasts, grippers for gripping the margin of an upper on a last, fluid-operated means for operating said grippers to pull the upper, valve means for controlling the flow of the operating fluid to and from said fluid-operated means, power-operated mechanism for automatically controlling said valve means to cause the grippers to pull the upper and then to hold it under tension for the inspection of the operator, mechanism movable by the operator after such inspection for controlling said valve means to cause the grippers to relax the force of the pull on the upper, and additional mechanism for further controlling said valve means to effect an adjustment of the upper by relative movement of the grippers after the force of the pull has thus been relaxed.

101. In a machine for shaping uppers over lasts, grippers for gripping the margin of an upper respectively at the opposite sides of a last, fluid-operated devices associated respectively with said different grippers for operating them to pull the upper, valve mechanisms associated respectively with said different devices for controlling the flow of the operating fluid to and from said devices, power-operated means for automatically controlling said valve mechanisms to cause the grippers to pull the upper and then to hold it under tension for the inspection of the operator, means movable by the operator after such inspection for controlling said valve mechanisms to cause the grippers to relax the force of the pull on the upper, and additional means for further controlling said valve mechanisms to cause the grippers to move respectively in opposite directions to adjust the upper relatively to the last after the force of the pull has thus been relaxed.

102. In a machine for shaping uppers over lasts, upper-gripping means for gripping the margin of an upper on a last, fluid-operated means for operating said upper-gripping means to pull the upper, means for controlling the flow of the operating fluid to said fluid-operated means to cause the upper-gripping means to pull the upper, and additional means optionally movable after the pulling of the upper for further controlling the flow of the operating fluid to cause said upper-gripping means to relax the force of the pull on the upper.

103. In a machine for shaping uppers over lasts, grippers for gripping the margin of an upper on a last, fluid-operated means for operating said grippers to pull the upper and for also imparting reverse movements to said grippers, valve means for controlling the flow of the operating fluid to and from said fluid-operated means, mechanism for controlling said valve means to cause the grippers to pull the upper, and additional mechanism optionally movable after the pulling of the upper for further controlling said valve means to cause the grippers to be moved reversely to relax the force of the pull on the upper.

104. In a machine for shaping uppers over lasts, upper-gripping means for gripping the margin of an upper on a last, fluid-operated means for operating said upper-gripping means to pull the upper, valve means for controlling the flow of the operating fluid to and from said fluid-operated means, power-operated mechanism for automatically controlling said valve means to cause the upper-gripping means to pull the upper and then to hold it under tension for the inspection of the operator, and additional mechanism movable by the operator after such inspection for further controlling said valve means to cause the upper-gripping means to relax the force of the pull on the upper.

105. In a machine for shaping uppers over lasts, grippers for gripping the margin of an upper on a last, fluid-operated devices associated respectively with said different grippers for operating them to pull the upper, valve mechanisms associated respectively with said different devices for controlling the flow of the operating fluid to and from said devices, power-operated means for automatically controlling said valve mechanisms to cause the grippers to pull the upper and then to hold it under tension for the inspection of the operator, and additional means movable by the operator after such inspection for further controlling said valve mechanisms to cause the grippers to relax the force of the pull on the upper.

106. In a machine for shaping uppers over lasts, upper-gripping means for gripping the margin of an upper on a last, fluid-operated means for operating said upper-gripping means to pull the upper and for also imparting reverse movement to said upper-gripping means, valve means for controlling the flow of the operating fluid to and from said fluid-operated means, mechanism movable by the operator after the pull on the upper for controlling said valve means to cause the upper-gripping means to be moved reversely to relax the force of the pull on the upper, and additional mechanism for automatically controlling said valve means to terminate such reverse movement of the upper-gripping means variably as determined by the extent of the movement of said first-named mechanism.

107. In a machine for shaping uppers over lasts, upper-gripping means for gripping the margin of an upper on a last, fluid-operated means for operating said upper-gripping means to pull the upper and for also imparting reverse movement to said upper-gripping means, valve means for controlling the flow of the operating fluid to and from said fluid-operated means, a member movable by the operator after the pull on the upper for controlling said valve means to cause the upper-gripping means to be moved reversely to relax the force of the pull on the upper, and mechanism movable automatically as determined by the reverse movement of the upper-gripping means for further controlling said valve means to terminate such reverse movement variably as determined by the extent of the movement of said member.

108. In a machine for shaping uppers over lasts, grippers for gripping the margin of an upper on a last, fluid-operated devices associated respectively with said different grippers for operating them to pull the upper and for also moving them reversely, valve mechanisms associated respectively with said different devices for controlling the flow of the operating fluid to and from said devices, a member movable by the operator after the pull on the upper for operating said valve mechanisms to cause reverse movements of the grippers, and mechanism movable as determined by the reverse movements of the grippers for further controlling said valve mechanisms to terminate such reverse movements variably as determined by the extent of the movement of said member.

109. In a machine for shaping uppers over lasts, grippers for gripping the margin of an upper on a last, fluid-operated means for operating said grippers to pull the upper and for also moving them reversely, valve means for controlling the flow of the operating fluid to and from said fluid-operated means, power-operated mechanism for automatically controlling said valve means to cause the grippers to pull the upper and then to hold it under tension for the inspection of the operator, a member movable by the operator after such inspection for further controlling said valve means to cause the grippers to be moved reversely, and mechanism movable automatically as determined by the reverse movements of the grippers for controlling said valve means to terminate such reverse movements variably as determined by the extent of the movement of said member.

110. In a machine for shaping uppers over lasts, upper-gripping means for gripping the margin of an upper on a last, fluid-operated means for operating said upper-gripping means to pull the upper and for also imparting reverse movement to said upper-gripping means, valve means for controlling the flow of the operating fluid to and from said fluid-operated means, and mechanism movable by the operator after the pull on the upper for controlling said valve means to cause the upper-gripping means to be moved reversely to relax the force of the pull on the upper, said valve means being movable to restore the full force of the pull on the upper upon reverse movement of said mechanism.

111. In a machine for shaping uppers over lasts, upper-gripping means for gripping the margin of an upper on a last, fluid-operated means for operating said upper-gripping means to pull the upper and for also imparting reverse movement to said upper-gripping means, valve means for controlling the flow of the operating fluid to and from said fluid-operated means, and mechanism movable by the operator after the pull on the upper for controlling said valve means to cause the upper-gripping means to be moved reversely to relax the force of the pull on the upper, said valve means being movable thereafter automatically to restore the full force of the pull on the upper.

112. In a machine for shaping uppers over lasts, grippers for gripping the margin of an upper on a last, fluid-operated means for operating said grippers to pull the upper and for also imparting reverse movements to said grippers, valve means for controlling the flow of the operating fluid to and from said fluid-operated means, and a member movable by the operator after the pull on the upper for controlling said valve means to cause the grippers to be moved reversely to relax the force of the pull on the upper, said valve means being movable automatically to restore the full force of the pull on the upper upon release of said member by the operator.

113. In a machine for shaping uppers over lasts, upper-gripping means for gripping the margin of an upper on a last, fluid-operated means for operating said upper-gripping means to pull the upper and for also imparting reverse movement to said upper-gripping means, valve means for controlling the flow of the operating fluid to and from said fluid-operated means, power-operated mechanism for automatically controlling said valve means in a cycle of automatic operations of the machine to cause the upper-gripping means to pull the upper and then to hold it under tension for the inspection of the operator with the machine at rest prior to the completion of the cycle, and additional mechanism movable by the operator after such inspection for further controlling said valve means to cause the upper-gripping means to be moved reversely to relax the force of the pull on the upper, said valve means being movable thereafter to restore the full force of the pull on the upper before the cycle of operations is resumed.

114. In a machine for shaping uppers over lasts, upper-gripping means for gripping the margin of an upper on a last, fluid-operated means for operating said upper-gripping means to pull the upper and for also moving said upper-gripping means reversely to starting position, means for controlling the flow of the operating fluid to said fluid-operated means to cause the upper-gripping means to pull the upper, and additional means optionally movable after the pulling of the upper for further controlling the flow of the operating fluid to cause the upper-gripping means to be moved reversely to starting position if conditions require that the upper be pulled again.

115. In a machine for shaping uppers over lasts, grippers for gripping the margin of an upper on a last, fluid-operated means for operating said grippers to grip and pull the upper, said fluid-operated means being also movable reversely to return the grippers to starting positions and to open them, valve means for controlling the flow of the operating fluid to and from said fluid-operated means, mechanism for controlling said valve means to cause the grippers to grip and pull the upper, and additional mechanism optionally movable after the pulling of the upper for further controlling said valve means to cause the grippers to be returned to starting positions and opened to release the upper and thereafter again operated to grip and pull the upper.

116. In a machine for shaping uppers over lasts, grippers for gripping the margin of an upper on a last, fluid-operated means for operating said grippers to pull the upper and for also moving them reversely to starting positions, valve means for controlling the flow of the operating fluid to and from said fluid-operated means, mechanism for controlling said valve means to cause the grippers to pull the upper, and additional mechanism optionally movable after the pulling of the upper for further controlling said valve means to cause the grippers to be returned to starting positions, said additional mechanism being thereafter reversely movable to cause the grippers again to pull the upper.

117. In a machine for shaping uppers over lasts, upper-gripping means for gripping the margin of an upper on a last, fluid-operated means for operating said upper-gripping means to pull the upper and for also moving said upper-gripping means reversely to starting position, valve means for controlling the flow of the operating fluid to and from said fluid-operated means, power-operated mechanism for automatically controlling said valve means in a cycle of automatic operations of the machine to cause the upper-gripping means to pull the upper and then to hold it under tension for the inspection of the operator with the machine at rest prior to the completion of the cycle, and additional mechanism movable by the operator after such inspection for further controlling said valve means to cause the upper-gripping means to be moved reversely to starting position before the cycle of operations is resumed if conditions require that the upper be pulled again.

118. In a machine for shaping uppers over lasts, upper-gripping means for gripping the margin of an upper on a last, fluid-operated means for operating said upper-gripping means to pull the upper and for also moving said upper-gripping means reversely to starting position, valve means for controlling the flow of the operating fluid to and from said fluid-operated means, power-operated mechanism for automatically controlling said valve means in a cycle of automatic operations of the machine to cause the upper-gripping means to pull the upper and then to hold it under tension for the inspection of the operator with the machine at rest prior to the completion of the cycle, and additional mechanism optionally movable after such inspection for further controlling said valve means to cause the upper-gripping means to be moved reversely to starting position and thereafter again operated to pull the upper before the cycle of operations is resumed.

119. In a machine for shaping uppers over lasts, upper-gripping means for gripping the margin of an upper on a last, fluid-operated means for operating said upper-gripping means to pull the upper and for also moving said upper-gripping means reversely to starting position, valve means for controlling the flow of the operating fluid to and from said fluid-operated means, power-operated mechanism for automatically controlling said valve means in a cycle of automatic operations of the machine to cause the upper-gripping means to pull the upper and then to hold it under tension for the inspection of the operator with the machine at rest prior to the completion of the cycle, and a member movable optionally by the operator after such inspection for further controlling said valve means to cause the upper-gripping means to be moved reversely to starting position, said valve means being movable automatically to cause the upper-gripping means again to pull the upper upon release of said member by the operator before the cycle of operations is resumed.

120. In a machine for shaping uppers over lasts, grippers for gripping the margin of an upper on a last, fluid-operated means for operating said grippers to grip and pull the upper, said fluid-operated means being also movable reversely to return the grippers to starting positions and to open them, valve means for controlling the flow of the operating fluid to and from said fluid-operated means, power-operated mechanism for automatically controlling said valve means in a cycle of automatic operations of the machine to cause the grippers to grip and pull the upper and then to hold it under tension for the inspection of the operator with the machine at rest prior to the completion of the cycle, and additional mechanism optionally movable after such inspection for further controlling said valve means to cause the grippers to be returned to starting positions and opened to release the upper before the cycle of operations is resumed.

121. In a machine for shaping uppers over lasts, grippers for gripping the margin of an upper on a last, fluid-operated means for operating said grippers to grip and pull the upper, said fluid-operated means being also movable reversely to return the grippers to starting positions and to open them, valve means for controlling the flow of the operating fluid to and from said fluid-operated means, power-operated mechanism for automatically controlling said valve means in a cycle of automatic operations of the machine to cause the grippers to grip and pull the upper and then to hold it under tension for the inspection of the operator with the machine at rest prior to the completion of the cycle, and additional mechanism optionally movable after such inspection for further controlling said valve means to cause the grippers to be moved reversely to starting positions and opened to release the upper, said valve means being movable thereafter to cause the grippers again to grip and pull the upper before the cycle of operations is resumed.

122. In a machine for shaping uppers over lasts, grippers for gripping the margin of an upper on a last, fluid-operated means for operating said grippers to pull the upper and for also moving them reversely to starting positions, valve mechanism for controlling the flow of the operating fluid to and from said fluid-operated means, power-operated cam means for automatically controlling said valve mechanism in a cycle of automatic operations of the machine to cause the grippers to pull the upper and then to hold it under tension for the inspection of the operator with the machine at rest prior to the completion of the cycle, and means optionally movable independently of said cam means after such inspection for further controlling said valve mechanism to cause the grippers to return to starting positions and thereafter again to pull the upper before the cycle of operations is resumed.

FRANK BYCROFT KEALL.
HAROLD LANE.